(12) United States Patent
Sato et al.

(10) Patent No.: US 7,669,888 B2
(45) Date of Patent: Mar. 2, 2010

(54) SIDE AIRBAG APPARATUS

(75) Inventors: Yuji Sato, Aichi-ken (JP); Michio Inoue, Aichi-ken (JP); Toshinori Tanase, Aichi-ken (JP); Atsushi Nagata, Aichi-ken (JP); Takashi Naito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 49 days.

(21) Appl. No.: 12/216,731

(22) Filed: Jul. 10, 2008

(65) Prior Publication Data
US 2009/0020988 A1 Jan. 22, 2009

(30) Foreign Application Priority Data
Jul. 19, 2007 (JP) ............................. 2007-188303
Jul. 19, 2007 (JP) ............................. 2007-188307

(51) Int. Cl.
*B60R 21/16* (2006.01)
(52) U.S. Cl. ................................................. 280/730.2
(58) Field of Classification Search ............. 280/730.2; 297/216.13, 216.14
See application file for complete search history.

(56) References Cited

U.S. PATENT DOCUMENTS 3,779,577 A * 12/1973 Wilfert .................... 280/730.1
2004/0232666 A1 * 11/2004 Sato et al. ................. 280/730.2
2005/0057024 A1 * 3/2005 Weston et al. ............. 280/730.2
2007/0108745 A1 * 5/2007 Belwafa et al. ........... 280/730.2
2008/0191453 A1 * 8/2008 Mansson et al. .......... 280/730.2
2009/0008913 A1 * 1/2009 Breuninger et al. ....... 280/730.2

FOREIGN PATENT DOCUMENTS

JP           A-10-81187           3/1998

* cited by examiner

*Primary Examiner*—Faye M. Fleming
(74) *Attorney, Agent, or Firm*—Posz Law Group, PLC

(57) ABSTRACT

In a vehicle to which a side airbag apparatus is applied, a rear frame portion of a seat frame is arranged near a rear end of an intermediate portion in a seat back, and an intermediate pad portion of a seat pad is arranged near a front end of the intermediate portion. An airbag is provided with a main airbag and an auxiliary airbag. The main airbag is inflated between a body side portion of the vehicle and an occupant by shooting out forward from an outer side portion of the seat back by a gas jetted out of an inflator. The auxiliary airbag presses a position near the outer side portion of the intermediate pad portion forward by being inflated between the rear frame portion and the intermediate pad portion by the gas jetted out of the inflator.

13 Claims, 30 Drawing Sheets

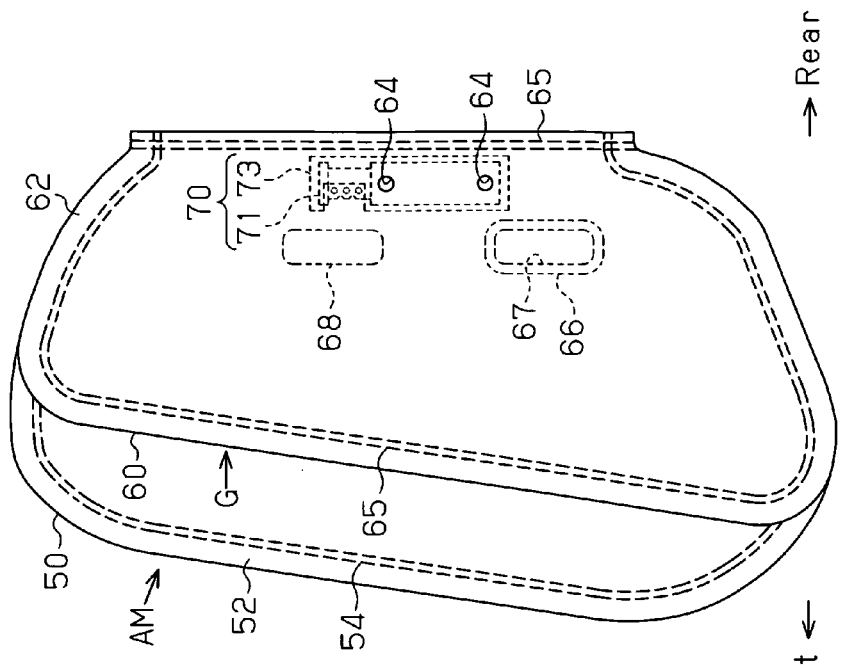
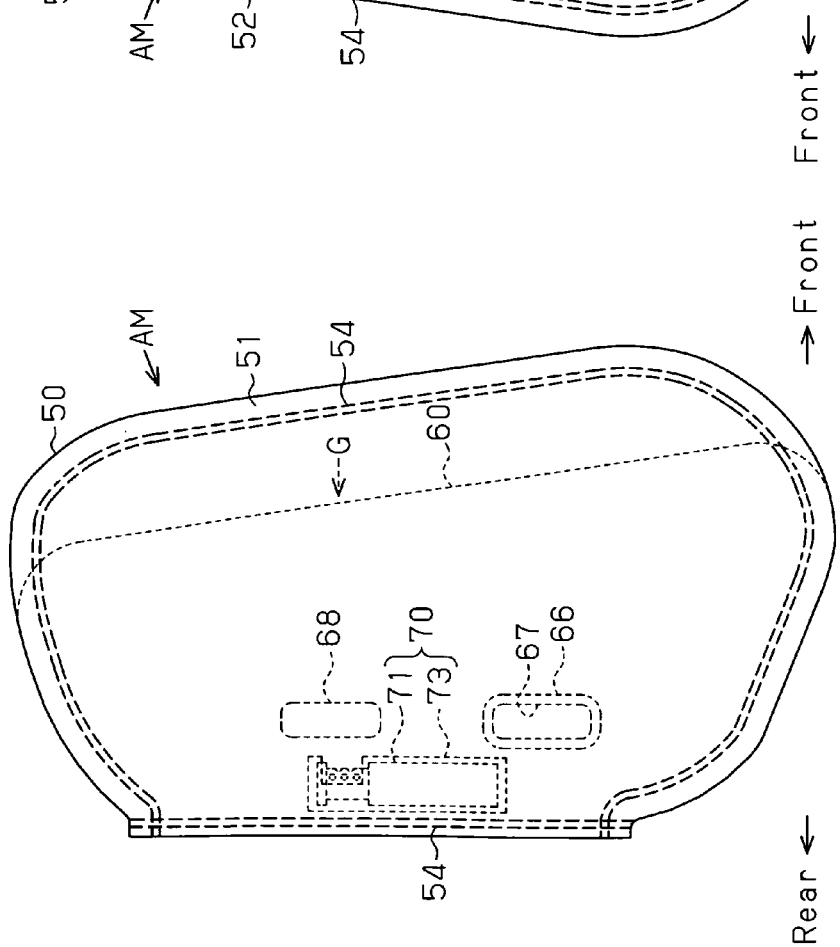

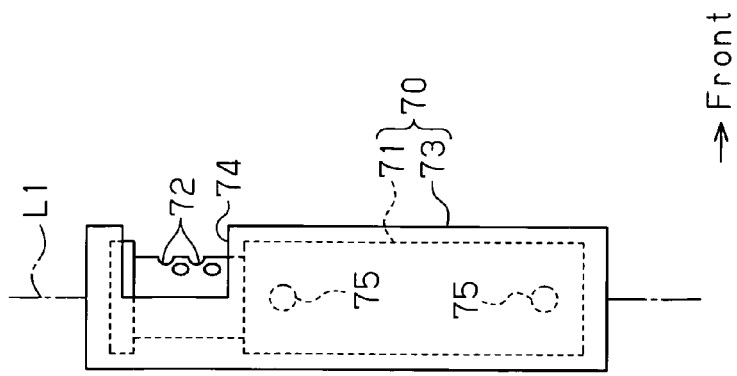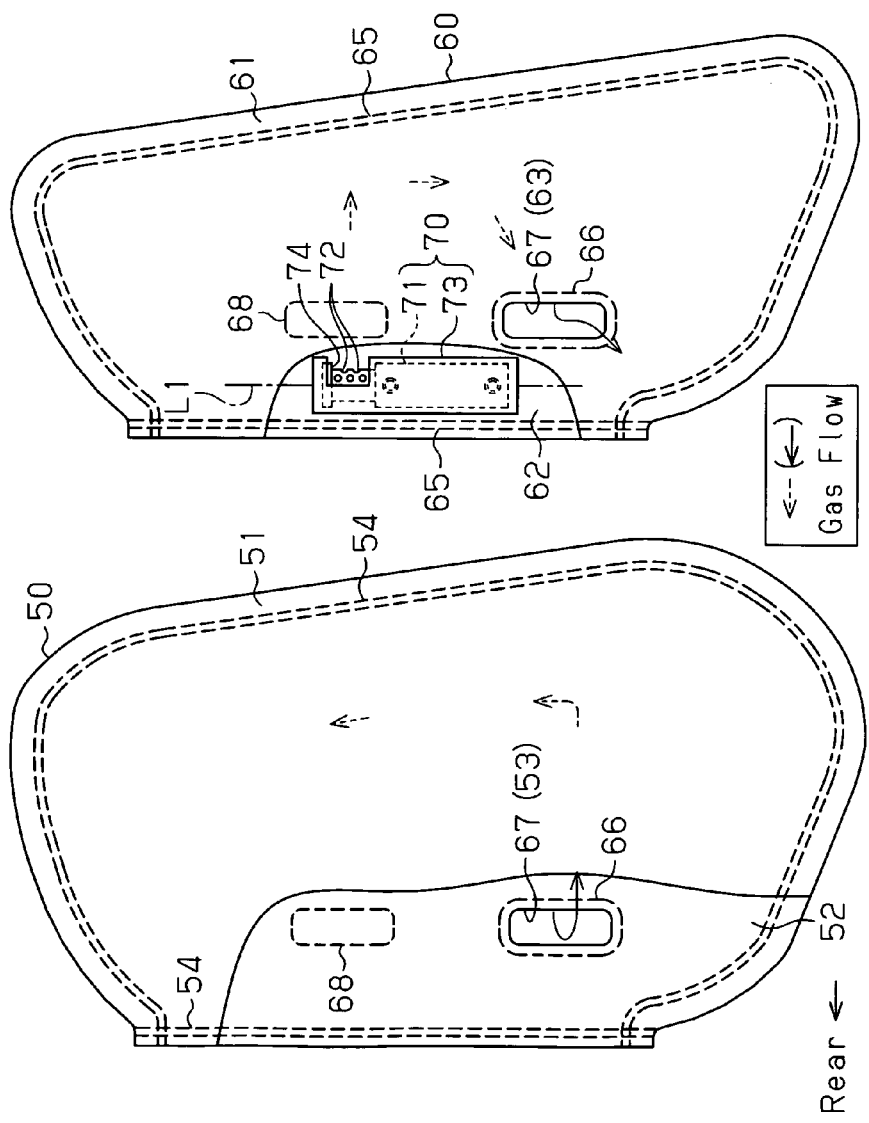

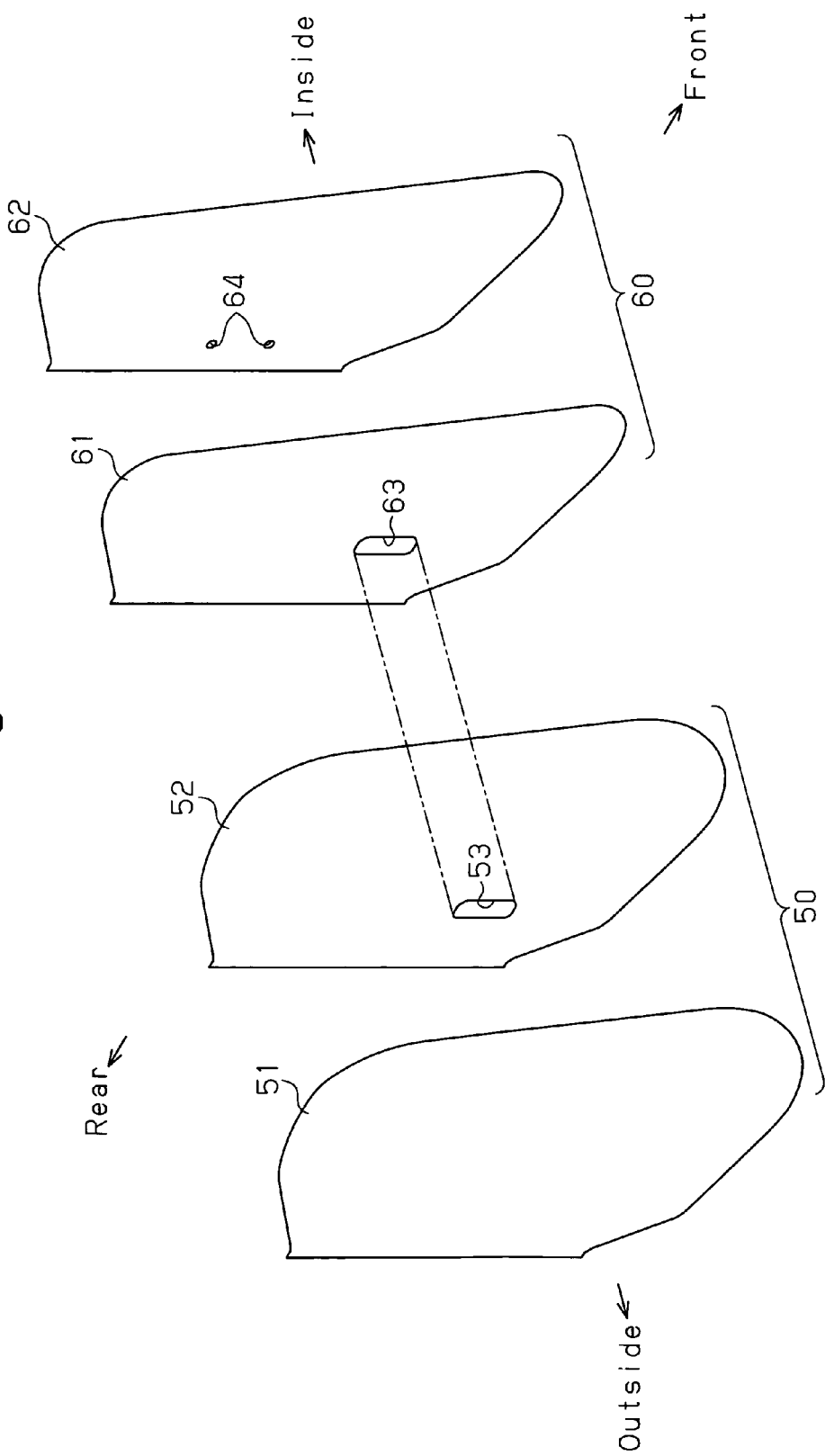

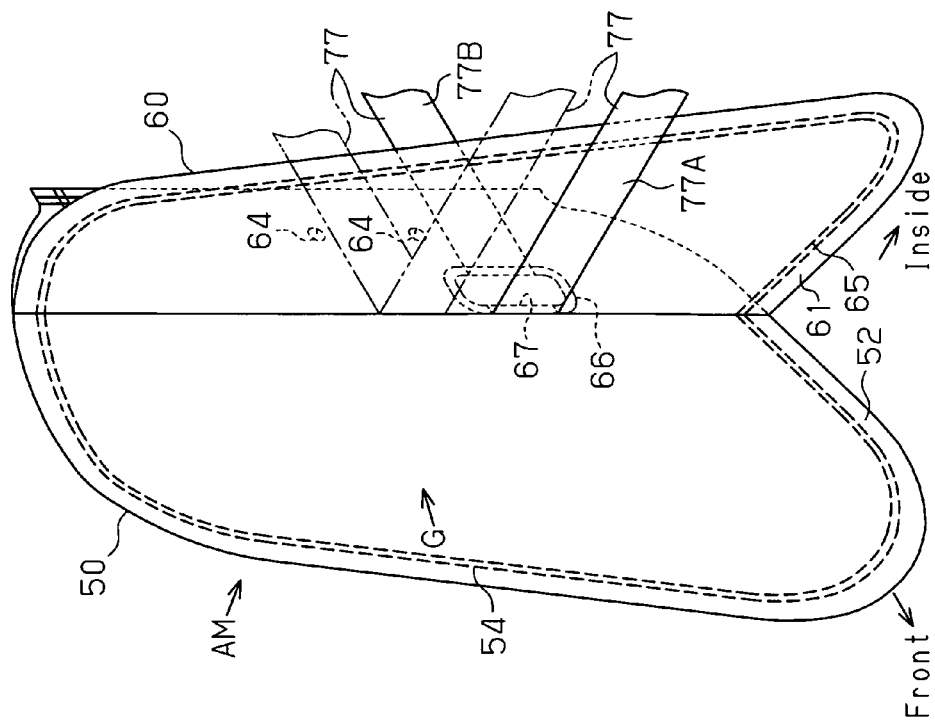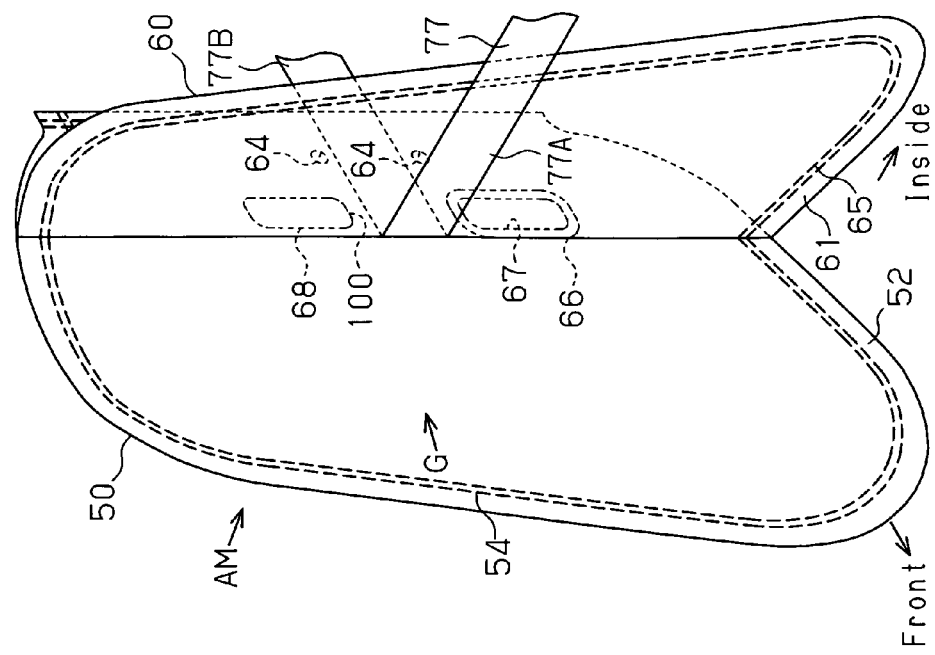

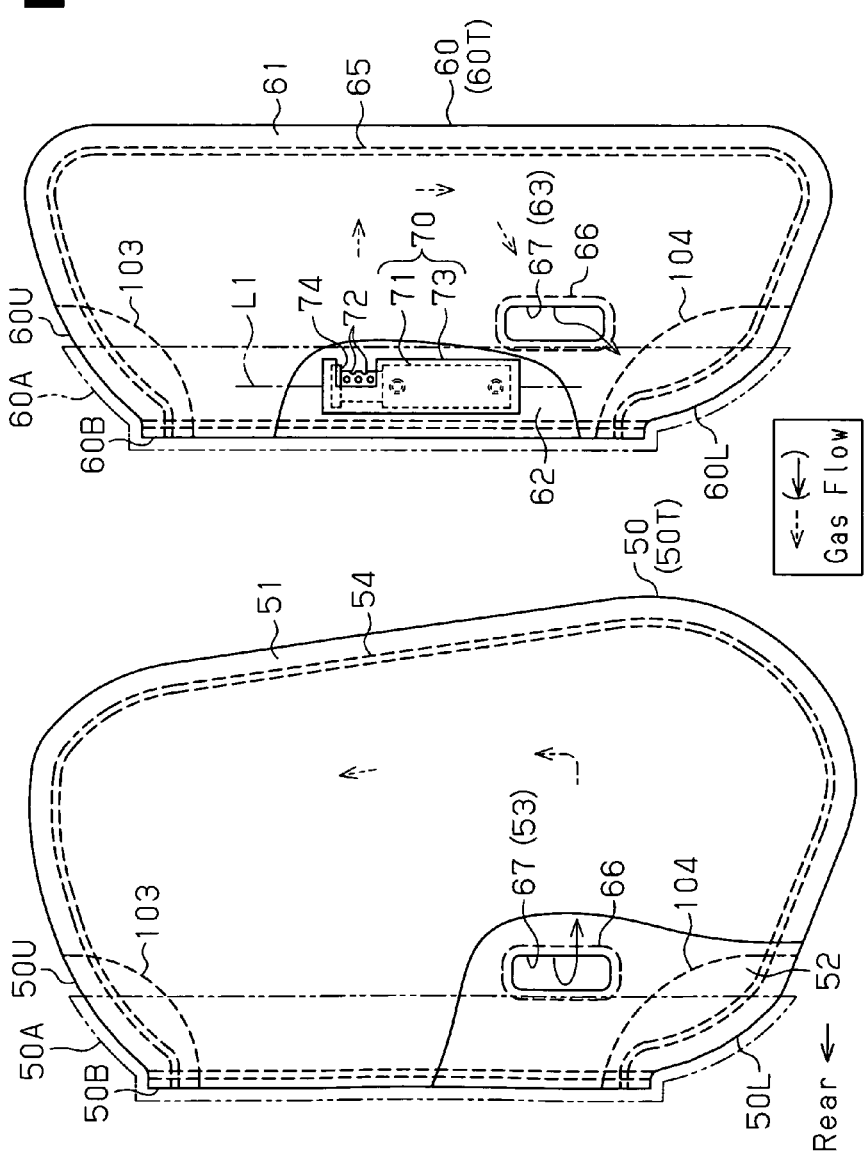

SIDE AIRBAG APPARATUS

BACKGROUND OF THE INVENTION

The present invention relates to a side airbag apparatus structured such as to inflate and deploy an airbag between a body side portion and a vehicular seat in the case that an impact is applied to a vehicle from a side, and reduce the impact by the airbag so as to protect an occupant.

For example, as disclosed in Japanese Laid-Open Patent Publication No. 10-81187, a side airbag apparatus has been widely known as an apparatus protecting an occupant from an impact applied to the vehicle from a side due to a side collision or the like. The side airbag apparatus is provided with an inflator and an airbag. The airbag is stored in a seat back (a backrest) of the vehicular seat in a state of being folded so as to be made compact.

In the side airbag apparatus, if an impact is applied to the body side portion of the vehicle from a side, a gas is jetted out from the inflator, and is fed into the airbag. The airbag is inflated and deployed by the gas, and the seat back is broken at a particular portion. The airbag shoots out of the broken position of the seat back in a state of leaving a part of the airbag within the seat back. The airbag is inflated and deployed forward from the seat back in a space between the occupant seated on the vehicular seat and the body side portion. The inflated and deployed airbag is interposed between the occupant and the body side portion making an intrusion into a passenger compartment so as to restrain the occupant. Accordingly, the impact transmitted to the occupant from the side through the body side portion is reduced.

The side airbag apparatus, as described above, inflates the airbag in the space between the occupant seated on the vehicular seat and the body side portion so as to absorb an impact. This space is narrower than a space at a time of other types of collisions than a side collision, for example, a front collision. Further, this space is varied in accordance with a size of the vehicle, and generally, the smaller the size of the vehicle, the narrower the space becomes. Even in such a narrow space, it is important to reliably inflate and deploy the airbag so as to reliably protect the occupant.

SUMMARY OF THE INVENTION

An objective of the present invention is to provide a side airbag apparatus which can reliably restrain an occupant by an airbag in a narrow space between a body side portion and the occupant, and improves a protecting performance of the occupant with respect to an impact applied from a side of a vehicle.

To achieve the foregoing and in accordance with one aspect of the present invention, a side airbag apparatus applied to a vehicle is provided. The vehicle is structured such that a seat back of a vehicular seat is provided with a seat frame and a seat pad arranged near the seat frame. A rear frame portion of the seat frame is arranged near a rear end in an intermediate portion in a vehicle width direction of the seat back, and an intermediate pad portion of the seat pad is arranged near a front end in the intermediate portion. The side airbag apparatus includes an inflator and an airbag inflated by a gas jetted out of the inflator. The inflator and the airbag are incorporated at least on an outer side portion of the seat back. The airbag has a main airbag and an auxiliary airbag. The main airbag is inflated between a body side portion of the vehicle and an occupant seated on the vehicular seat by being caused to shoot out forward from an outer side portion of the seat back by a gas from the inflator. The auxiliary airbag pressing a portion near the outer side portion of the intermediate pad portion forward by being inflated between the rear frame portion and the intermediate pad portion by the gas from the inflator.

BRIEF DESCRIPTION OF THE DRAWINGS

FIG. 7A is a side elevational view as seen from a vehicle outer side, showing the airbag module in a state of being deployed without filling both main and auxiliary airbags with gas;

FIG. 7B is a side elevational view as seen from a vehicle inner side, showing the airbag module;

FIG. 8A is a side elevational view showing the main airbag;

FIG. 8B is a side elevational view showing the auxiliary airbag;

FIG. 8C is a side elevational view showing an inflator assembly;

FIG. 9 is a perspective view showing base fabric sheets constructing the main and auxiliary airbags;

FIG. 21 is a perspective view as seen from a vehicle inner side, showing an airbag module in a state of being deployed without filling both main and auxiliary airbags with gas;

FIG. 22 is a perspective view as seen from a vehicle inner side, showing an airbag module in a state of being deployed without filling both main and auxiliary airbags with gas according to another embodiment;

FIG. 32A is a side elevational view, with a part cut away, showing a part of the main airbag;

FIG. 32B is a side elevational view, with a part cut away, showing a part of the auxiliary airbag;

FIG. 32C is a side elevational view showing an inflator assembly;

DETAILED DESCRIPTION OF THE PREFERRED EMBODIMENTS

First Embodiment

A description will be given below of a first embodiment in accordance with the present invention with reference to FIGS. 1 to 14. The description is given below by setting a forward moving direction of a vehicle to a front side and setting a backward moving direction of the vehicle to a rear side. Further, a vertical direction indicates a vertical direction of the vehicle, and a lateral direction indicates a width direction of the vehicle, that is, a lateral direction at a time when the vehicle moves forward. Further, in each of the drawings, "front" indicates the forward moving direction of the vehicle, "rear" indicates the backward moving direction of the vehicle, "inner" indicates an inner side of the vehicle, and "outer" indicates an outer side of the vehicle.

Figure 1:
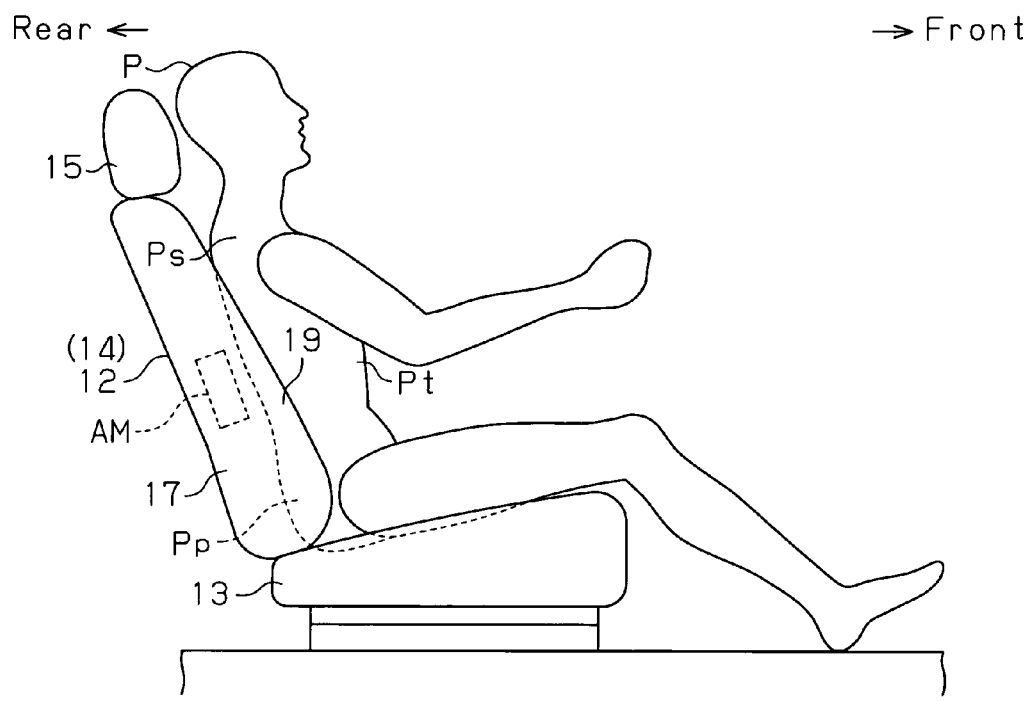
FIG. 1 is a schematic side elevational view showing a vehicular seat to which a side airbag apparatus in accordance with a first embodiment of the present invention is applied.
Figure 2:
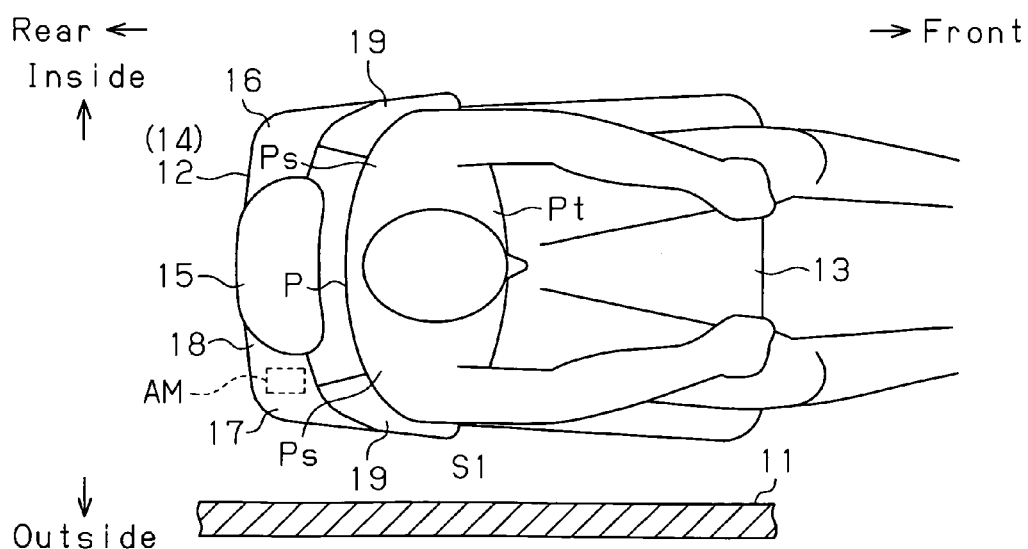
FIG. 2 is a plan view showing a positional relationship between the vehicular seat and a body side portion.

As shown in FIGS. 1 and 2, a vehicular seat 12 is arranged in the vicinity of a body side portion 11 within a passenger compartment. The body side portion 11 is a member arranged in a side portion of a vehicle, and is mainly constituted by doors, pillars, and the like. The body side portion 11 corresponding to a front seat is constituted by a front door, a center pillar (B pillar) and the like. The body side portion 11 corresponding to a rear seat is constituted by rear portions of side doors (rear doors), a C pillar, front portions of a wheel well, a rear quarter and the like. In the present embodiment, the vehicular seat 12 is a driver seat.

The vehicular seat 12 is provided with a seat cushion (a seat portion) 13, a seat back (a backrest portion) 14, and a head rest 15. The seat back 14 is provided with an inner side portion 16 positioned on a vehicle inner side, an outer side portion 17 positioned on a vehicle outer side, and an intermediate portion 18 positioned between the inner and outer side portions 16 and 17. A front portion of each of the inner and outer side portions 16 and 17 corresponds to a side support portion 19. The side support portion 19 protrudes further forward than the intermediate portion 18. The side support portions 19 support an occupant P in such a manner as to regulate a motion in a vehicle width direction of the occupant P seated on the vehicular seat 12 to recline against the seat back 14.

Figure 3:
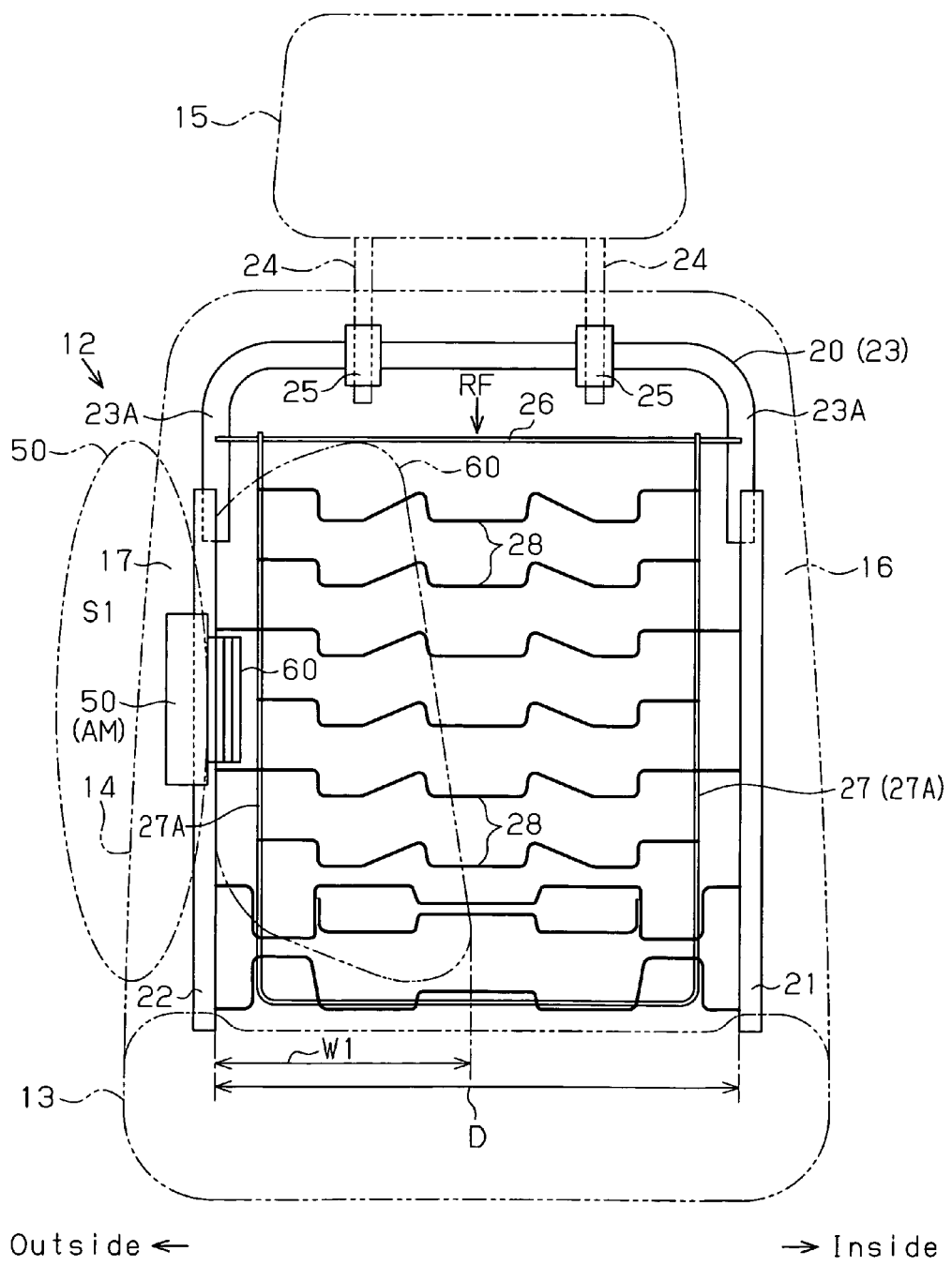
FIG. 3 is a front elevational view showing a seat frame of a seat back.
Figure 4:
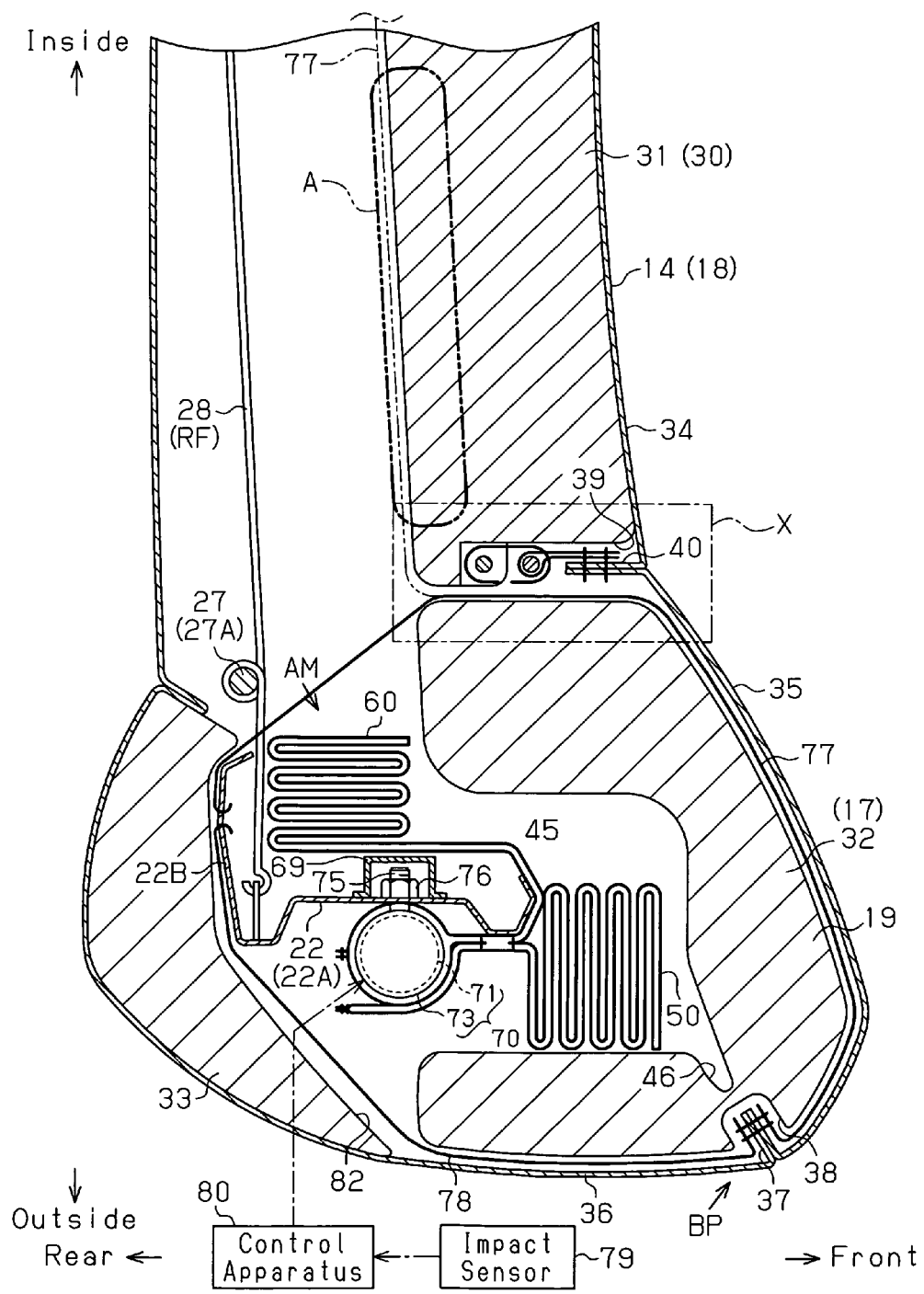
FIG. 4 is a cross-sectional plan view showing an internal structure of an outer side portion of the seat back.

As shown in FIGS. 3 and 4, a framework of the seat back 14 is constructed by a seat frame 20. The seat frame 20 is provided with an inner side frame portion 21, an outer side frame portion 22, and an upper frame portion 23. The inner side frame portion 21 is arranged within the inner side portion 16 of the seat back 14. The outer side frame portion 22 is arranged within the outer side portion 17 of the seat back 14. The inner and outer side frame portions 21 and 22 extend substantially along the vertical direction. The outer side frame portion 22 is formed by bending a metal plate. The outer side frame portion 22 is provided with a plate-like side wall portion 22A extending along the forward moving direction of the vehicle, and a plate-like rear wall portion 22B bent inward from a rear end of the side wall portion 22A. The side wall portion 22A and the rear wall portion 22B both extend substantially along the vertical direction, and have a planar shape. The inner side frame portion 21 has a similar structure to the outer side frame portion 22. Lower ends of the inner and outer side frame portions 21 and 22 are rotatably supported to a seat cushion frame (not shown) by a shaft extending in the vehicle width direction. The seat frame 20 can be tilted along the forward moving direction of the vehicle around the shaft serving as a supporting point.

The upper frame portion 23 is arranged in an upper portion of the seat back 14. A major part of the upper frame portion 23 extends along the vehicle width direction. Both ends of the upper frame portion 23 are bent substantially downward. The upper frame portion 23 is formed substantially as an inverted-U shape as a whole. Both ends 23A and 23A of the upper frame portion 23 are fixed to respective upper ends of the inner and outer side frame portions 21 and 22 by welding or the like.

A pair of pipes 25 for inserting two support columns 24 of the head rest 15 are fixed to the upper frame portion 23. A horizontal frame portion 26 constructed by a bar member is built between the ends 23A and 23A of the upper frame portion 23. An auxiliary frame portion 27 formed substantially as a U-shaped form is suspended from the horizontal frame portion 26. A plurality of wire frame portions 28 are built in a state of being away from each other in the vertical direction, between a pair of vertical portions 27A of the auxiliary frame portion 27, or between the inner and outer side frame portions 21 and 22. A rear frame portion RF is constructed by the horizontal frame portion 26, the auxiliary frame portion 27 and the wire frame portion 28.

A seat pad 30 made of an elastic material such as urethane foam is provided in the vicinity of the seat frame 20. The seat pad 30 is provided with an intermediate pad portion 31 positioned on the front side of the rear frame portion RF, a front side pad portion 32 positioned on the front side of each of the inner and outer side frame portions 21, and a rear side pad portion 33 positioned on the rear side of each of the inner and outer side frame portions 21. As shown in FIG. 4, the intermediate pad portion 31 is widely away forward from the rear frame portion RF. The intermediate pad portion 31 may be close to the rear frame portion RF. In short, the structure may be made such that an auxiliary airbag 60 can enter a portion between the rear frame portion RF and the intermediate pad portion 31.

The seat pad 30 is covered by a plurality of covers 34 to 36. The covers 35 and 36 are superposed in a front portion of the outer side surface of the outer side portion 17 so as to be sewn. The sewn portion (hereinafter, refer to as "side sewn portion 37") is accommodated in a groove portion 38 provided in a front portion of an outer side surface of the front side pad portion 32. The side sewn portion 37 has a strength which is lower than a non-sewn portion of the covers 35 and 36. The side sewn portion 37 constructs a part of a breakable portion BP broken by a main airbag 50.

Figure 6:
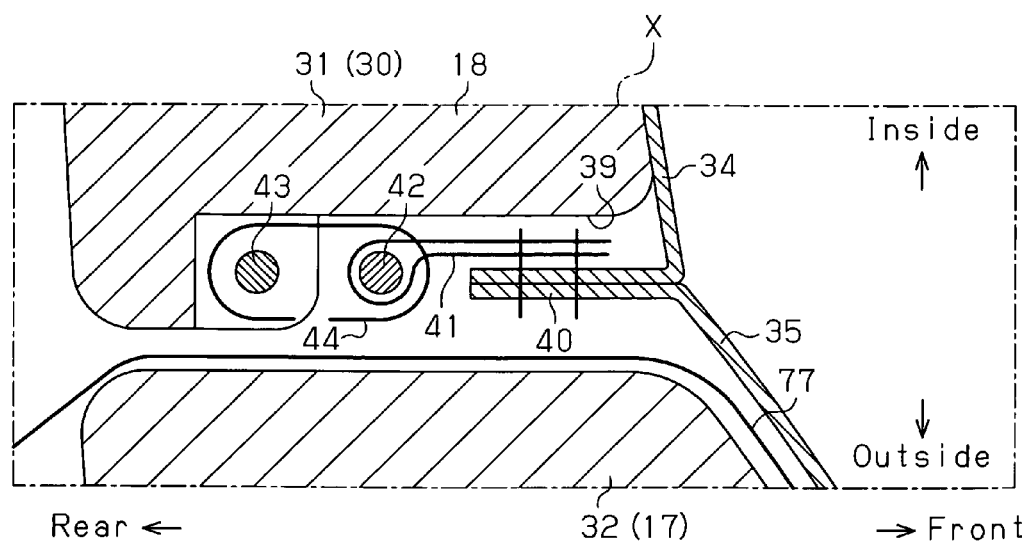
FIG. 6 is a cross-sectional plan view showing portion X in FIG. 4 in an enlarged manner.

As shown in FIG. 6, a groove portion 39 is provided between the intermediate pad portion 31 and the front side pad portion 32. The covers 34 and 35 are superposed in a boundary portion between the outer side portion 17 and the intermediate portion 18 so as to be sewn. The sewn portion (hereinafter, refer to as "intermediate sewn portion 40") is accommodated within the groove portion 39 in a state of being pulled rearward.

In order to retain the intermediate sewn portion 40 in the rearward pulled state, the following structure is employed. A wire attaching portion 41 made of a fabric or the like is sewn to the intermediate sewn portion 40. A suspension wire 42 extending substantially along the vertical direction is inserted to the wire attaching portion 41. An insert wire 43 extending along the vertical direction is embedded on the rear side of the groove portion 39 in the intermediate pad portion 31. The suspension wire 42 and the insert wire 43 are coupled at a plurality of positions in the vertical direction by caulking a ring 44. As a material of the ring 44, a metal is generally used. FIG. 6 shows the ring 44 in a state before being caulked.

As shown in FIG. 4, an accommodating space 45 for incorporating an airbag module AM is provided around the outer side frame portion 22 between the front side pad portion 32 and the rear side pad portion 33. The airbag module AM corresponds to a main portion of the side airbag apparatus.

A front end of an outer side portion of the accommodating space 45 is provided with a slit 46 extending toward the side sewn portion 37 (the groove portion 38) of the covers 35 and 36. In the front side pad portion 32, a thin portion is formed between the slit 46 and the side sewn portion 37 (the groove portion 38). The thin portion constructs the breakable portion BP together with the side sewn portion 37.

The airbag module AM is provided with an airbag and an inflator assembly 70. A description will be given next of each of the constructing members.

<Airbag>

The airbag is provided with the main airbag 50 and the auxiliary airbag 60. The main airbag 50 is arranged within the accommodating space 45 in a folded state. The main airbag 50 shoots out forward from the outer side portion 17 of the seat back 14 by a gas jetted out from the inflator assembly 70, and is inflated and deployed between the body side portion 11 and the occupant P seated on the vehicular seat 12 (refer to FIG. 14). The main airbag 50 is an airbag used in a normal side airbag apparatus. The auxiliary airbag 60 is inflated between the rear frame portion RF and the intermediate pad portion 31 positioned on the front side of the rear frame portion RF, by the gas from the inflator assembly 70. The auxiliary airbag 60 presses forward a position A which is close to the outer side portion 17 of the intermediate pad portion 31.

FIG. 7A shows a state in which the airbag module AM in a state of being deployed without filling the main airbag 50 and the auxiliary airbag 60 with gas is seen from the vehicle outer side. FIG. 7B shows a state in which the airbag module AM in the same state as FIG. 7A is seen from the vehicle inner side. FIG. 8A shows a state in which the main airbag 50 is seen from the vehicle outer side. FIG. 8B shows a state in which the auxiliary airbag 60 is seen from the vehicle outer side. FIG. 9 shows the constructing parts of the main airbag 50 and the auxiliary airbag 60.

As shown in FIGS. 7A, 8A and 9, the main airbag 50 is provided with a pair of front and back base fabric sheets 51 and 52. As the base fabric sheets 51 and 52, it is preferable to employ a fabric which has a high strength, has a flexibility, and can be easily folded, for example, a woven fabric made of a polyester yarn, a polyamide yarn or the like.

The base fabric sheets 51 and 52 have such size and shape that can protect the occupant P seated on the vehicular seat 12 (refer to FIGS. 1 and 2) from a lumbar region Pp to a thorax Pt at a time when the main airbag 50 finishes the inflation and deployment. The size and the shape of the base fabric sheets 51 and 52 may be changed in correspondence to a site of the occupant P protected by the main airbag 50. As a site to be protected, for example, there can be listed up only the thorax Pt of the occupant P, a position from the lumbar region Pp to shoulders Ps, and the like.

A hole 53 is provided in a rear portion of the base fabric sheet 52 on the back side. In the first embodiment, the hole 53 extends substantially along the vertical direction. The hole 53 may have a different shape from that of the first embodiment. The base fabric sheets 51 and 52 are formed as a bag shape by bonding their peripheral edge coupling portions 54. The peripheral edge coupling portions 54 are formed by sewing peripheral edge portions of the base fabric sheets 51 and 52 by using a sewing thread shown by a thick broken line in FIG. 8A. In this case, the number of the sewing thread may be set to one, or two or more. The peripheral edge coupling portion 54 in accordance with the present embodiment uses two sewing threads. Further, besides the sewing thread, the peripheral edge coupling portion 54 may be formed by adhesion by means of an adhesive agent.

As shown in FIGS. 7B, 8B and 9, the auxiliary airbag 60 is provided with a pair of base fabric sheets 61 and 62 made of the same material as the main airbag 50. The base fabric sheets 61 and 62 have such a size and a shape that can press the position A which is close to the outer side portion 17 of the intermediate pad portion 31, at a time when the auxiliary airbag 60 finishes the inflation and deployment. It is desirable that a width W1 in the vehicle width direction of the base fabric sheets 61 and 62 is one quarter to one half of an interval D between the inner and outer side frame portions 21 and 22 (refer to FIG. 3). The base fabric sheet 61 on the front side is provided with a hole 63 substantially having the same shape as the hole 53. In the base fabric sheet 62 on the back side, a bolt insertion hole 64 is provided at two positions which do not correspond to the hole 63.

In the same manner as the main airbag 50, the base fabric sheets 61 and 62 are formed as a bag shape by bonding peripheral edge coupling portions 65. Further, the peripheral edge coupling portion 65 is formed by a sewing thread shown by a thick broken line in FIG. 8B. Both of the main airbag 50 and the auxiliary airbag 60 may be formed by bending one base fabric sheet into two in a center portion and coupling peripheral edge portions.

The main airbag 50 and the auxiliary airbag 60 are coupled by an inner coupling portion 66 surrounding the holes 53 and 63 in a state in which the holes 53 and 63 are brought into line with each other. The inner coupling portion 66 is formed by sewing peripheries of the holes 53 and 63 in the base fabric sheet 52 on the back side of the main airbag 50 and the base fabric sheet 61 on the front side of the auxiliary airbag 60 by the sewing thread. The inner coupling portion 66 may be formed by adhesion by means of the adhesive agent in addition to the sewing. A communicating hole portion 67 connecting the interior of the main airbag 50 with the interior of the auxiliary airbag 60 is formed by the holes 53 and 63 and the inner coupling portion 66.

The main airbag 50 and the auxiliary airbag 60 are also coupled by a second inner coupling portion 68. The second inner coupling portion 68 is provided at a position which is away upward from the inner coupling portion 66. The second inner coupling portion 68 is formed by sewing the base fabric sheets 52 and 61 by the sewing thread, but, may be formed by adhesion. The shape of the second inner coupling portion 68 is not particularly limited. The second inner coupling portion 68 is formed substantially as a rectangular loop shape which does not have any end portion. At a position surrounded by the second inner coupling portion 68, the interior of the main airbag 50 does not communicate with the interior of the auxiliary airbag 60 unlike the inner coupling portion 66.

As mentioned above, the main airbag 50 and the auxiliary airbag 60 are coupled only at two positions of the inner coupling portion 66 and the second inner coupling portion 68, and are not coupled at the other positions. The main airbag 50 and the auxiliary airbag 60 are not coupled by the peripheral edge coupling portions 54 and 65.

<Inflator Assembly 70>

Figure 5:
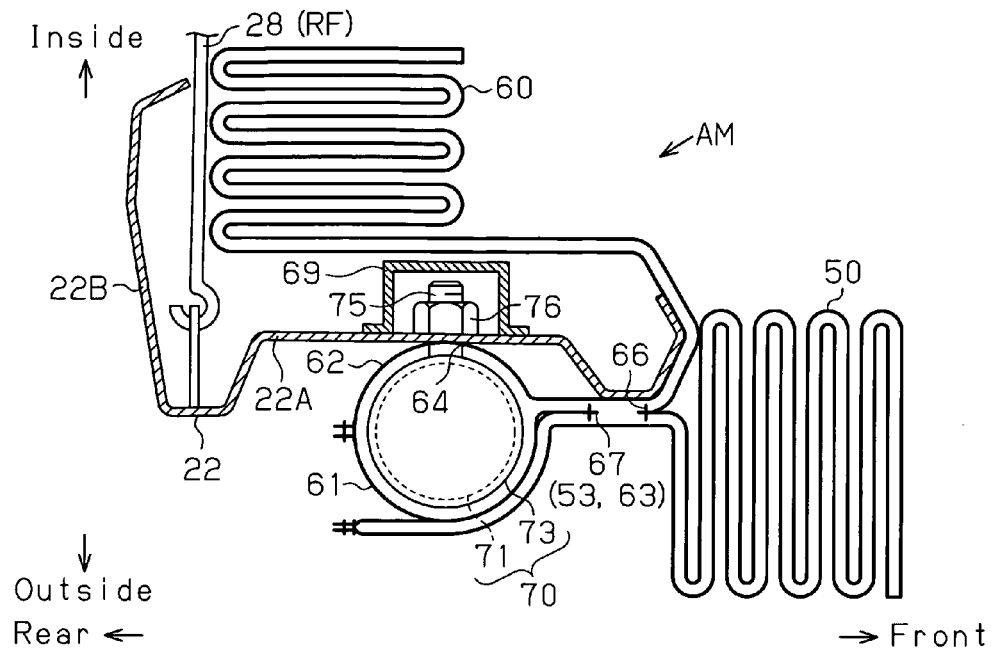
FIG. 5 is a cross-sectional plan view showing an outer side frame portion and an airbag module.

As shown in FIGS. 5 and 8C, the inflator assembly 70 is provided with an inflator 71 serving as a gas generating source, and a retainer 73 installed to an outer side of the inflator 71. The inflator 71 is formed substantially a columnar shape. A gas generating agent (not shown) is accommodated in the inflator 71. In the pyro type inflator 71 mentioned above, the gas is generated on the basis of a combustion reaction of the gas generating agent. An upper portion of the inflator 71 is provided with a gas outlet port 72 for jetting out the generated gas outward along a radial direction. A harness (not shown) forming a wiring for applying a control signal to the inflator 71 is connected to a lower end of the inflator 71. In place of the pyro type inflator using the gas generating agent, it is possible to use a hybrid type inflator which breaks a partition wall of a high-pressure gas cylinder filled with a high-pressure gas by a low explosive or the like so as to jet out the gas.

The retainer 73 serves as a diffuser, and fastens the inflator 71 to the outer side frame portion 22 together with the airbag (the auxiliary airbag 60). The retainer 73 has a substantially tubular shape which is extended in the vertical direction. A major part of the retainer 73 is formed by bending a plate material such as a metal plate or the like. An upper front surface of the retainer 73 is provided with a window portion 74 for exposing the gas outlet port 72 of the inflator 71. The gas jetted out from the gas outlet port 72 is jetted out substantially forward through the window portion 74 of the retainer 73. The retainer 73 is provided with two bolts 75 (refer to FIG. 5). The bolt 75 is provided respectively in an upper portion and a lower portion of the retainer 73.

The inflator assembly 70 is arranged within the auxiliary airbag 60. The bolt 75 of the retainer 73 is inserted to the bolt insertion holes 64 and 64 of the base fabric sheet 62 on the back side, and is exposed to the outside of the auxiliary airbag 60. In this state, as shown in FIG. 8B, the inflator 71 formed as the columnar shape is arranged within the auxiliary airbag 60 together with the retainer 73 in a state in which its axis L1 is directed to the vertical direction. The communicating hole portion 67 is provided at a position which is widely apart downward from the gas outlet port 72 along the axis L1 of the inflator 71. The communicating hole portion 67 is positioned in the vicinity of an end portion on an opposite side to the gas outlet port 72 of the inflator 71, that is, a lower end of the inflator 71. The inflator 71 may be provided integrally with the retainer 73.

The airbag module AM is set to a compact mode (hereinafter, refer to as "accommodation form") by the main airbag 50 and the auxiliary airbag 60 being folded from the deployed state. As shown in FIG. 5, the main airbag 50 and the auxiliary airbag 60 are accordion folded. The main airbag 50 and the auxiliary airbag 60 are folded back while alternately changing the bending direction per fixed width from the front end toward the rear end.

The airbag module AM made compact is arranged as follows in relation to the outer side frame portion 22. The main airbag 50 is arranged in the vicinity of the vehicle outer side of the outer side frame portion 22. The accordion folded portion of the main airbag 50 is folded forward in relation to the outer side frame portion 22. In contrast, a part of the auxiliary airbag 60 in which the inflator assembly 70 is accommodated is arranged in the vicinity of the vehicle outer side of the outer side frame portion 22. The auxiliary airbag 60 passes around the rear side from the front side of the side wall portion 22A of the outer side frame portion 22, and extends to the vehicle inner side of the outer side frame portion 22. The accordion folded portion of the auxiliary airbag 60 is folded toward the vehicle inner side in relation to the outer side frame portion 22.

Two bolts 75 extending through the respective bolt insertion holes 64 of the auxiliary airbag 60 are fastened to nuts 76 in a state of being inserted to the side wall portion 22A of the outer side frame portion 22. On the basis of the fastening, the inflator assembly 70 is fixed to the outer side frame portion 22 together with the airbag (the auxiliary airbag 60). The cover 69 is attached to the side wall portion 22A of the outer side frame portion 22 from the vehicle inner side. The cover 69 covers the bolts 75 and the nuts 76 so as to prevent the auxiliary airbag 60 from being scratched. In place of the cover 69, a position in the vicinity of the bolts 75 and the nuts 76 may be protruded to the vehicle inner side in the side wall portion 22A. The same advantage as the cover 69 can be obtained by forming the protruded portion in such a manner as to surround the bolts 75 and the nuts 76.

As shown in FIG. 4, for the purpose of improving a deploying performance of the main airbag 50, two band bodies (hereinafter, refer to as "stay cloths 77 and 78") are wound between the covers 35 and 36 and the front side pad portion 32. Each of the stay cloths 77 and 78 is made of a material having a low extendability, and is provided around the outer side frame portion 22 and the airbag module AM. One end portion of each of the stay cloths 77 and 78 is sewn together with the covers 35 and 36 in the side sewn portion 37. The other end portion of each of the stay cloths 77 and 78 is locked to a rear wall portion 22B of the outer side frame portion 22. The stay cloths 77 and 78 come to an extended state at an early stage of the inflation and deployment of the main airbag 50. Accordingly, the inflation of the main airbag 50 in a different direction from a predetermined deploying direction is suppressed. Further, the stay cloths 77 and 78 suppress a deformation of the front side pad portion 32 and an extension of the covers 35 and 36. Accordingly, the breakable portion BP triggers the breakage. As mentioned above, the stay cloths 77 and 78 assist the breakage of the outer side portion 17 by the main airbag 50.

The stay cloth 77 is away upward or downward from the deploying area of the auxiliary airbag 60 (between the rear frame portion RF and the intermediate pad portion 31). On the basis of this arrangement, the stay cloth 77 does not interfere with the auxiliary airbag 60 at a time when the auxiliary airbag 60 is inflated and deployed.

The same advantage can be also obtained by arranging the stay cloth 77 at a position which does not hinder the inflation and deployment of the auxiliary airbag 60, that is, in such a manner as not to connect the rear end of the vehicle inner side of the front side pad portion 32 to the front end on the vehicle inner side of the rear side pad portion 33. Specifically, the stay cloth 77 may be arranged in such a manner as to face the vehicle inner side along the rear surface of the intermediate pad portion 31, as shown by a two-dot chain line in FIG. 4. In this case, the end portion of the stay cloth 77 may be locked to the inner side frame portion 21 (refer to FIG. 3) of the seat frame 20. In accordance with this structure, the deploying area of the auxiliary airbag 60 can be secured.

The side airbag apparatus is provided with an impact sensor 79 and a control apparatus 80 in addition to the airbag module AM. The impact sensor 79 is constituted by an acceleration sensor or the like, and is provided in the body side portion 11 or the like of the vehicle. The impact sensor 79 detects an impact applied to the body side portion 11 from a side. The control apparatus 80 controls an actuation of the inflator 71 on the basis of a detection signal from the impact sensor 79.

In the side airbag apparatus mentioned above, if an impact equal to or more than a predetermined value is applied to the body side portion 11 of the vehicle, and the impact application is detected by the impact sensor 79, a driving electric current is output to the inflator 71 from the control apparatus 80 on the basis of the detected signal. A high-temperature and high-pressure gas begins to be generated by the gas generating agent within the inflator 71 in the side portion (the outer side portion 17) on the vehicle outer side of the seat back 14, by heating on the basis of the driving electric current. This gas begins to be jetted out forward from the gas outlet port 72 through the window portion 74 of the retainer 73 (refer to each of arrows in FIGS. 8B and 12). A path through which the gas flows is shown by a numbered arrow in FIG. 12. The gas flows in numerical order from an arrow having a smaller number. The larger the number of the arrow, the more downward side the path is.

If the main airbag 50 and the auxiliary airbag 60 are folded together, it is hard to deploy and inflate the main airbag 50 and the auxiliary airbag 60 in different directions from each other. In other words, it is hard to deploy and inflate the main airbag 50 to the front side of the vehicle as well as deploying and inflating the auxiliary airbag 60 to the vehicle inner side.

In this regard, in the first embodiment, the gas is first fed into the auxiliary airbag 60 set to the accommodation form. Then, the pressure of the gas is applied to each of the portions within the auxiliary airbag 60. Further, the auxiliary airbag 60 begins to be inflated from an earlier timing than the main airbag 50. At this time, the auxiliary airbag 60 is deployed from the folded state without being affected by the main airbag 50. Further, the auxiliary airbag 60 begins to be inflated and deployed to the vehicle inner side between the rear frame portion RF and the intermediate pad portion 31 (refer to a two-dot chain line in FIG. 10).

Figure 11:
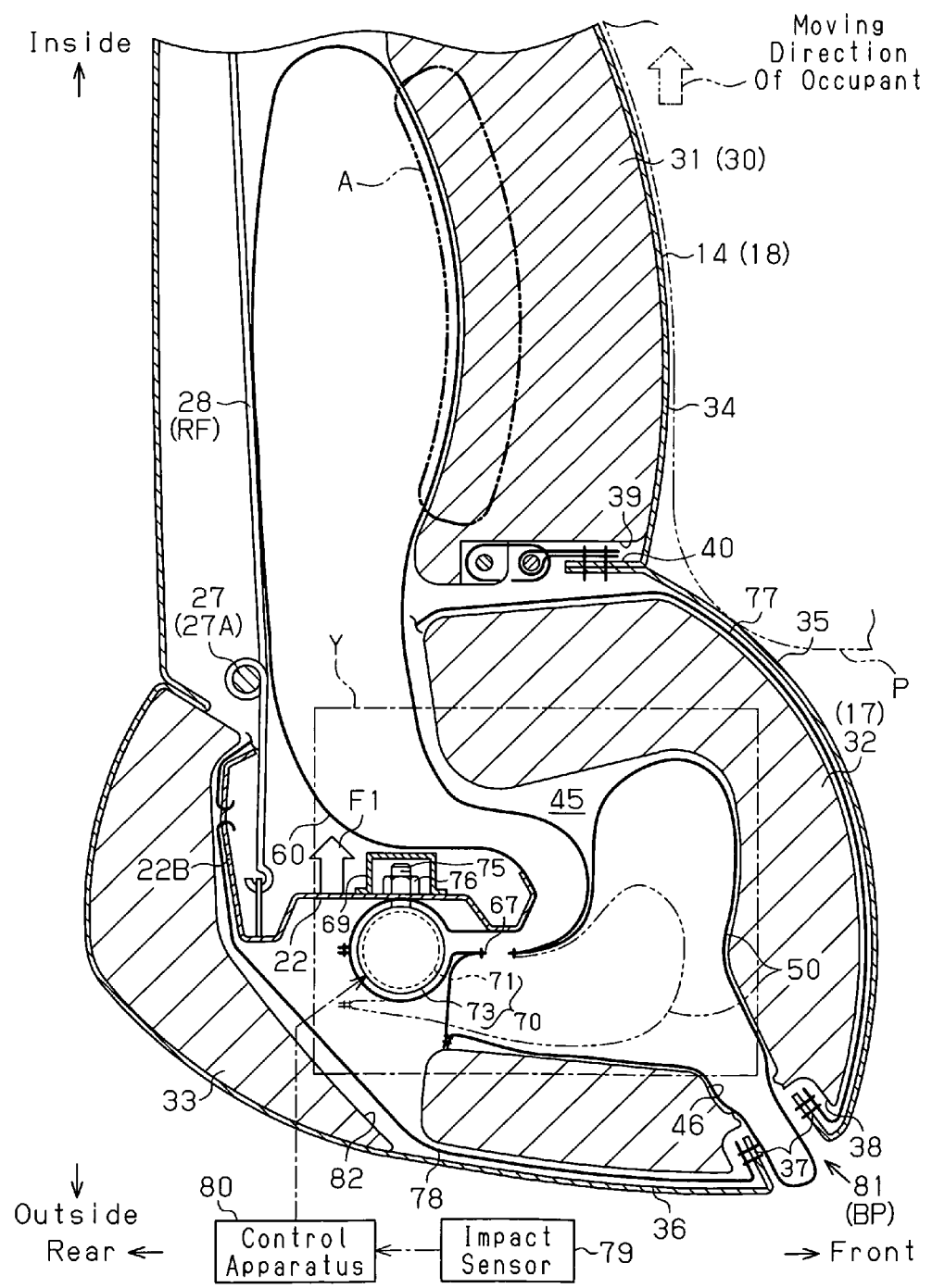
FIG. 11 is a cross-sectional plan view showing a state in which the auxiliary airbag and the main airbag are inflated further from the state in FIG. 10.
Figure 12:
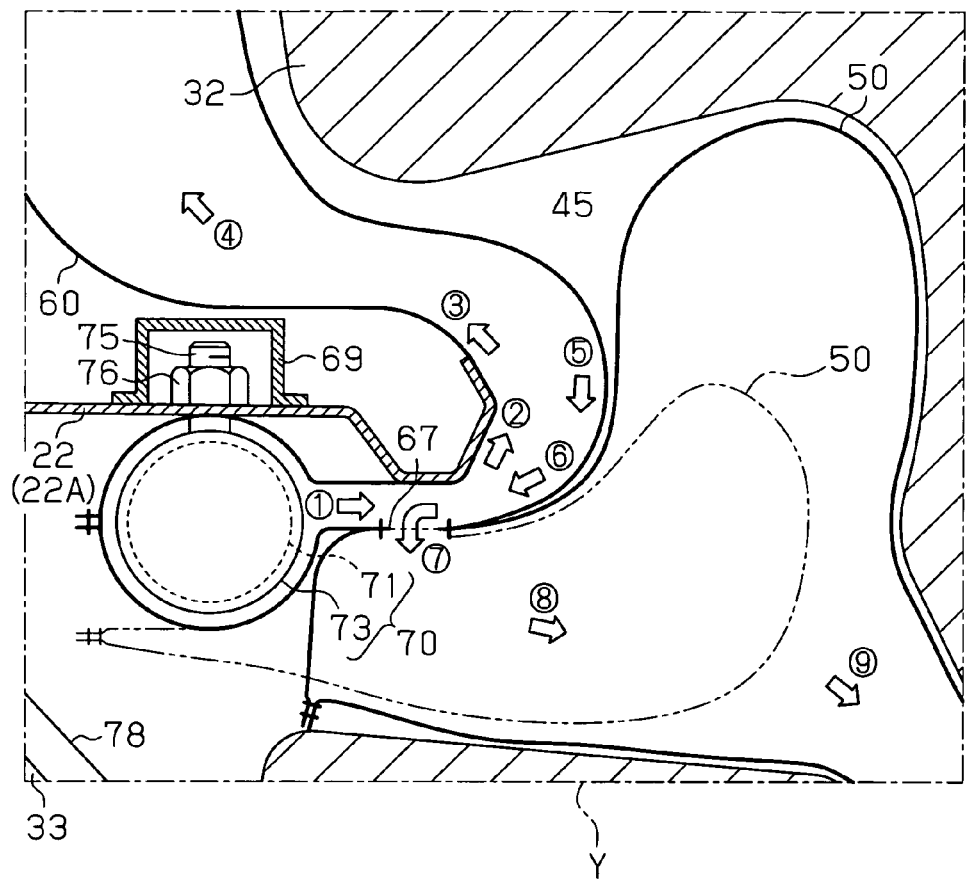
FIG. 12 is a cross-sectional plan view showing portion Y in FIG. 11 in an enlarged manner.
Figure 14:
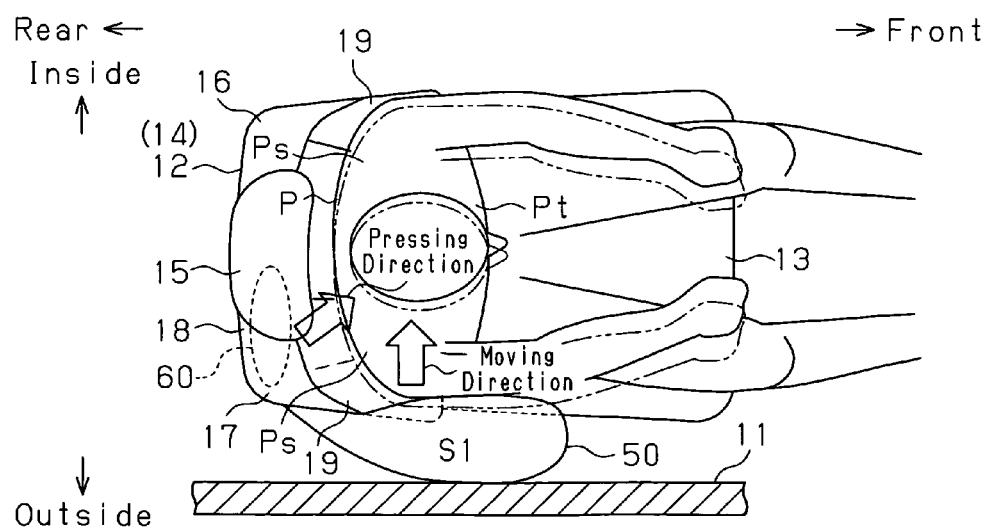
FIG. 14 is a schematic plan view showing a state in which the auxiliary airbag and the main airbag are inflated from the state in FIG. 2.

The side wall portion 22A of the outer side frame portion 22 has a high rigidity. Accordingly, the side wall portion 22A serves as a pressure receiving portion receiving the pressure of the gas flowing toward the vehicle outer side, and generates a reaction force F1 directed to the vehicle inner side. The auxiliary airbag 60 is reliably and quickly inflated and deployed to the vehicle inner side on the basis of the reaction force F1. Further, the auxiliary airbag 60 is brought into contact with the intermediate pad portion 31. As shown in FIG. 11, the position A close to the outer side portion 17 of the intermediate pad portion 31 is pressed so as to be inflated forward by the inflating auxiliary airbag 60. The back of the occupant P reclining against the seat back 14 is pushed diagonally forward by the inflating intermediate pad portion 31, and is moved to the vehicle inner side. An arrow in FIG. 14 shows a pressing direction at this time. The moving direction at this time corresponds to a direction which comes away from the body side portion 11 of the vehicle. Prior to the restraint of the occupant P by the main airbag 50, the intermediate pad portion 31 is pressed and inflated by the auxiliary airbag 60, and the occupant P is moved to the vehicle inner side. On the basis of the movement mentioned above, the narrow space S1 between the body side portion 11 and the occupant P is expanded in the vehicle width direction.

The gas hardly flows into the main airbag 50 through the communicating hole portion 67 until the gas fills the auxiliary airbag 60 to some extent. This is because the communicating hole portion 67 is provided in the vicinity of the lower end of the inflator 71 and is widely away downward from the gas outlet port 72, as shown in FIGS. 8A and 8B.

If the auxiliary airbag 60 is filled with the gas to some extent and is sufficiently inflated, the gas begins to flow into the main airbag 50 through the communicating hole portion 67. Accordingly, the main airbag 50 begins to be deployed and inflated behind the auxiliary airbag 60 (refer to a two-dot chain line in FIG. 11). Further, the main airbag 50 is brought into contact with the front side pad portion 32. In accordance with the progress of the inflation, the main airbag 50 presses the front side pad portion 32 forward. At this time, a part of the main airbag 50 goes into the slit 46. The main airbag 50 goes on being inflated and deployed after going into the slit 46.

Accordingly, the outer side portion 17 is broken at the breakable portion BP as shown in FIG. 11 in accordance with the progress of the inflation of the main airbag 50. In other words, the thin portion between the slit 46 and the groove portion 38 is broken, the sewn state of the side sewn portion 37 is canceled, and an opening 81 is formed. The main airbag 50 shoots out to an outer side of the seat back 14 from the opening 81 while widening the opening 81 generated by the breakage. At this time, the portion on the vehicle inner side than the opening 81 in the front side pad portion 32 is opened forward around the intermediate sewn portion 40 serving as the supporting point. A notch 82 is provided between the front side pad portion 32 and the rear side pad portion 33. A portion on the rear side than the opening 81 in the front side pad portion 32 is opened rearward around the notch 82 serving as the supporting point.

Figure 13:
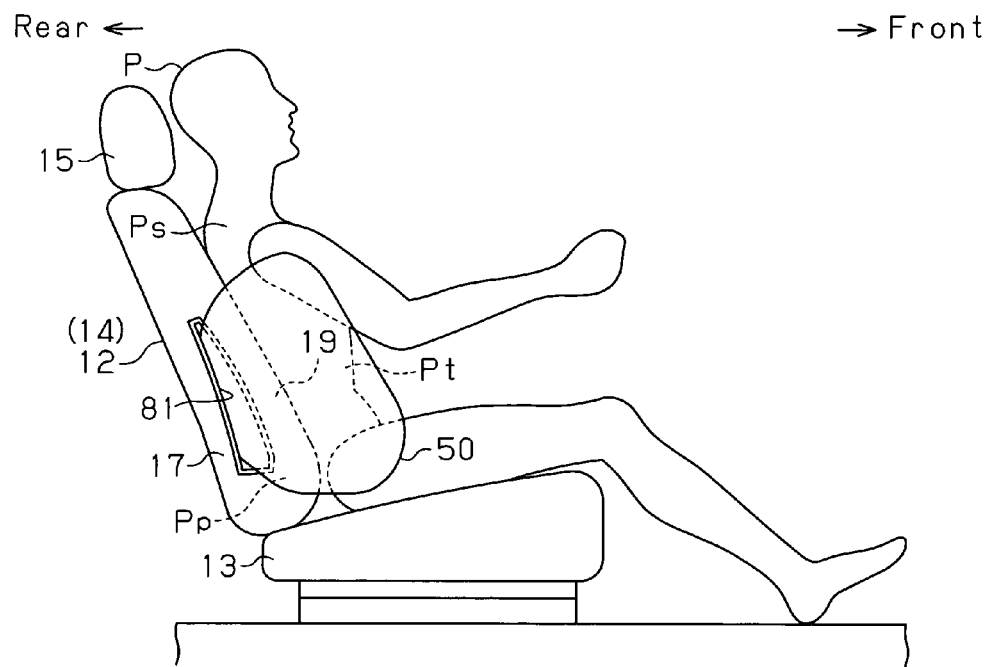
FIG. 13 is a schematic side elevational view showing a state in which the main airbag shoots out of the seat back of the vehicular seat in FIG. 1 so as to be inflated and deployed.

Thereafter, the main airbag 50 goes on being inflated and deployed, and is inflated and deployed forward in the space outside of the seat back 14, more accurately, between the body side portion 11 and the occupant P, as shown by a solid line in FIGS. 13 and 14. At this time, the space S1 between the body side portion 11 and the occupant P is enlarged in the vehicle width direction, on the basis of the movement of the occupant P by the auxiliary airbag 60. Accordingly, since the main airbag 50 is reliably inflated and deployed between the occupant P and the body side portion 11 making an intrusion into the passenger compartment, it is possible to restrain the occupant P. In other words, the inflated and deployed main airbag 50 is interposed between the occupant P, particularly a wide range from the thorax Pt to the lumbar region Pp, and the body side portion 11 making an intrusion into the passenger compartment. Further, the impact from a side transmitted to the occupant P through the body side portion 11 is reduced. At this time, the occupant P is previously pushed by the intermediate pad portion 31 and is moved to the vehicle inner side. Accordingly, although the main airbag 50 directly presses the occupant P to the vehicle inner side, the impact transmitted to the occupant P from the body side portion 11 is reduced.

In accordance with the first embodiment mentioned above, the following advantages are obtained.

(1) The side airbag apparatus is provided with the auxiliary airbag 60 in addition to the main airbag 50 (refer to FIG. 4). The main airbag 50 shoots out forward from the seat back 14 so as to be inflated between the body side portion 11 and the occupant P. The auxiliary airbag 60 is inflated between the rear frame portion RF and the intermediate pad portion 31, and presses the position A close to the outer side portion 17 of the intermediate pad portion 31 forward. Accordingly, it is possible to move the occupant P to the vehicle inner side by the inflating auxiliary airbag 60, and it is possible to expand the narrow space S1 between the body side portion 11 and the occupant P in the vehicle width direction. Therefore, since the occupant P is reliably restrained by the main airbag 50, the protecting performance of the occupant P against the impact applied from a side of the vehicle is improved.

(2) The main airbag 50 and the auxiliary airbag 60 are coupled to each other via the communicating hole portion 67 connecting the interior of the main airbag 50 with the interior of the auxiliary airbag 60. Further, the inflator 71 is arranged within the auxiliary airbag 60 (refer to FIGS. 8A and 8B). Accordingly, it is possible to feed the gas jetted out from the inflator 71 in the order of the auxiliary airbag 60→ the communicating hole portion 67→ the main airbag 50. Therefore, it is possible to start inflation of the auxiliary airbag 60 at an earlier timing than the main airbag 50.

(3) In conjunction with the item (2) mentioned above, the communicating hole portion 67 is provided in an end portion on an opposite side to the gas outlet port 72 of the inflator 71, that is, near a lower end of the inflator 71. In other words, the communicating hole portion 67 is widely away downward from the gas outlet port 72 (refer to FIGS. 8B and 12). Accordingly, it is possible to feed the gas jetted out from the gas outlet port 72 to the auxiliary airbag 60 so as to inflate the auxiliary airbag 60. Further, the gas hardly flows into the main airbag 50 from the communicating hole portion 67 until the gas fills the auxiliary airbag 60 to some extent. Accordingly, it is possible to inflate the main airbag 50 behind the auxiliary airbag 60.

Figure 10:
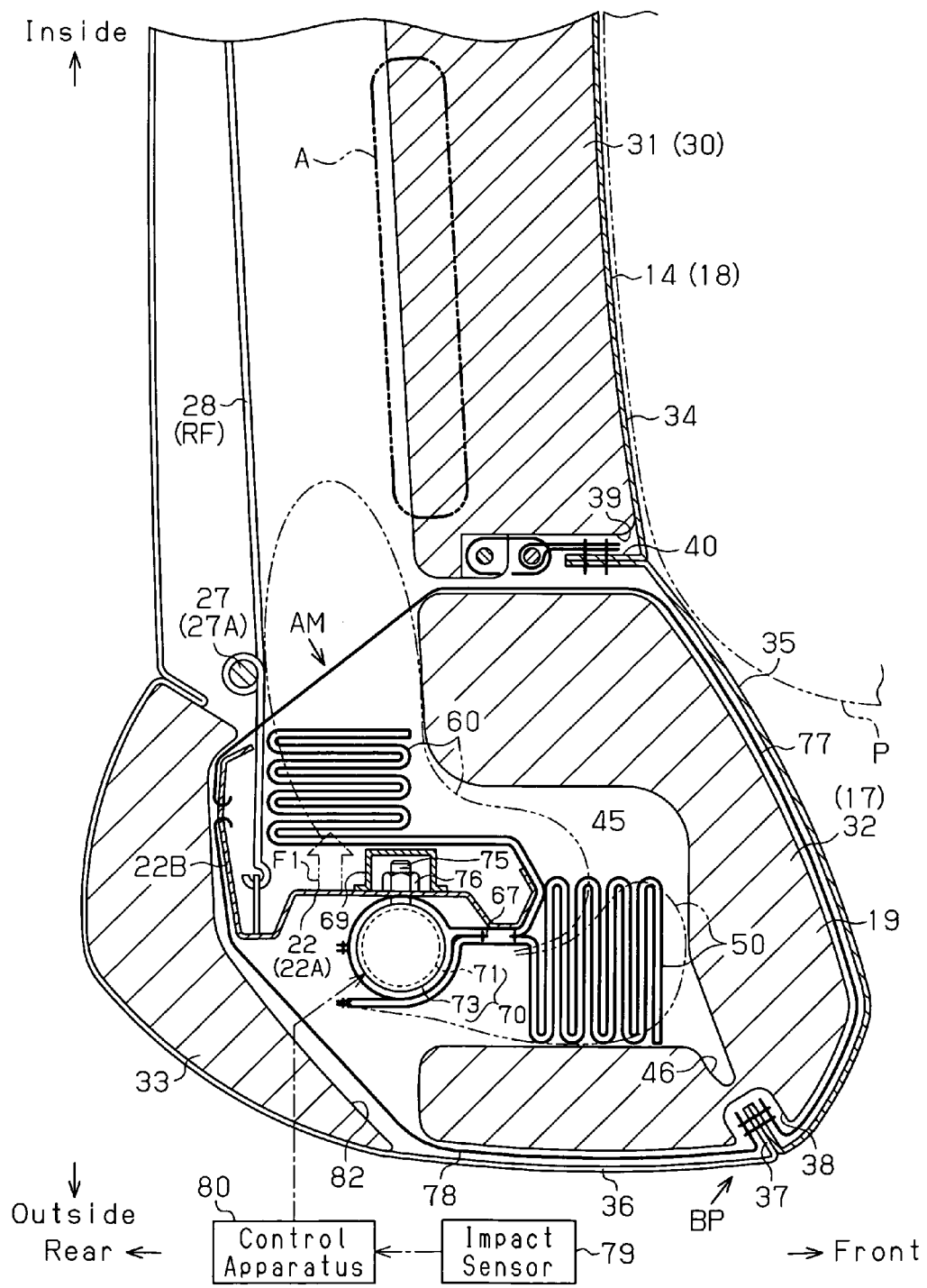
FIG. 10 is a cross-sectional plan view showing a stage in the process of inflation of the auxiliary airbag and the main airbag from the state in FIG. 4.

(4) In addition to the main airbag 50, the auxiliary airbag 60 is arranged near the vehicle inner side of the outer side frame portion 22 in a state of being folded (refer to FIG. 10). Accordingly, it is possible to inflate and deploy the auxiliary airbag 60 between the rear frame portion RF and the intermediate pad portion 31 without being affected by the main airbag 50. Further, the outer side frame portion 22 can reliably inflate and deploy the auxiliary airbag 60 toward the vehicle inner side, while receiving the gas within the auxiliary airbag 60 so as to generate the reaction force F1 directed to the vehicle inner side. In other words, since the existing outer side frame portion 22 serves as the pressure receiving portion, it is not necessary to independently provide the pressure receiving portion.

The first embodiment may be modified as follows.

(a) The outer side frame portion 22 may have a different shape from the first embodiment. For example, the outer side frame portion 22 may be constituted by a pipe having a circular cross-sectional shape, a rectangular cross-sectional shape or the like. Further, the airbag module AM may be directly attached to the outer side frame portion 22, or may be indirectly attached to the outer side frame portion 22 via a bracket or the like.

(b) The main airbag 50 and the auxiliary airbag 60 may be coupled to each other in other positions in addition to the inner coupling portion 66.

(c) The main airbag 50 and the auxiliary airbag 60 in the state of being deployed without being filled with the gas may be folded in accordance with a different folding method from the first embodiment. As the folding method, for example, there can be listed an inward folding (a cactus folding), a roll folding and the like. The inward folding is a folding method in which an end portion of the airbag is folded back so as to be positioned in an inner side of other portion (a middle portion). The roll folding is a folding method in which one end portion of the airbag is set as a center and other portions is wound around the one end portion of the airbag.

(d) The communicating hole portion 67 may be provided at a plurality of positions between the main airbag 50 and the auxiliary airbag 60.

(e) The inflator assembly 70 may be arranged within the auxiliary airbag 60 in a different posture from the first embodiment. For example, the inflator assembly 70 may be arranged in such a posture that the gas outlet port 72 of the inflator 71 comes to a lower side. In this case, it is desirable that the communicating hole portion 67 be arranged at an end portion on an opposite side to the gas outlet port of the inflator 71, that is, near an upper end of the inflator 71.

(f) The side collision of the vehicle may be predicted by using a side collision predicting sensor such as milliwave data, and the inflator 71 may be activated prior to the side collision. In this case, it is possible to start inflating the auxiliary airbag 60 in an earlier timing than the first embodiment so as to move the occupant P to the vehicle inner side.

(g) A head protecting airbag may be installed in the vehicle. In this case, the head protecting airbag is inflated in conformity to the inflation of the auxiliary airbag 60. Further, it is possible to assist the movement of a whole of the body of the occupant P to the vehicle inner side, by moving the head of the occupant P seated on the vehicular seat 12 to the vehicle inner side.

(h) The main airbag 50 and the auxiliary airbag 60 may be incorporated within the seat back 14 in a state of being folded together. In this case, the main airbag 50 and the auxiliary airbag 60 in a state of being deployed without being filled with the gas are superposed so as to be folded. In this case, there is required a means for inflating and deploying the auxiliary airbag 60 toward the vehicle inner side and inflating and deploying the main airbag 50 forward.

Second Embodiment

Next, a description will be given of a second embodiment in accordance with the present invention with reference to FIGS. 15 and 16. The same reference numerals are attached to the same positions, members and the like as those of the first embodiment, and a description thereof will be omitted.

The second embodiment is further provided with a guide means for guiding the auxiliary airbag 60 between the rear frame portion RF and the intermediate pad portion 31 at least in an early stage of the inflation of the auxiliary airbag 60. The guide means is constituted by a front guide member 85 arranged near the rear portion of the intermediate pad portion 31, and a rear guide member 88 arranged near the front portion of the rear frame portion RF. Both of the front and rear guide members 85 and 88 are formed as a plate shape, and are formed by a hard material such as a synthetic resin.

The front guide member 85 is provided with a main body portion 86 extending along the vehicle width direction, and a bent portion 87 bent forward from an outer end of the main body portion 86. An inner end 86B of the main body portion 86 is positioned in a region surrounded by the stay cloths 77 and 78, that is, on the rear side of the front side pad portion 32, as shown by a solid line in FIG. 15.

A rear surface of the main body portion 86 corresponds to a front guide surface 86A which is substantially orthogonal to the forward moving direction of the vehicle. The main body portion 86 of the front guide member 85 is adhered to the front side pad portion 32. The front guide member 85 may be fixed to the seat frame 20 via a bracket or the like (not shown) in place of the adhesion.

The rear guide member 88 is provided with a main body portion 89 extending in the vehicle width direction, and a bent portion 90 bent forward from an outer end of the main body portion 89. A front surface of the main body portion 89 corresponds to a rear guide surface 89A which is substantially orthogonal to the forward moving direction of the vehicle. The bent portion 90 of the rear guide member 88 is fixed to the outer side frame portion 22. As shown in FIG. 15, the rear guide member 88 may be fixed to the outer side frame portion 22 by using the bolt 75 and the nut 76 of the inflator assembly 70.

In the second embodiment, the deploying direction of the auxiliary airbag 60 is regulated to the vehicle inner side by the front guide member 85 and the rear guide member 88, at a time when the auxiliary airbag 60 is inflated by being supplied with the gas, and the folded state of the auxiliary airbag 60 begins to be dissolved (deployed). In the early stage of the inflation of the auxiliary airbag 60, the auxiliary airbag 60 is reliably guided between the rear frame portion RF and the intermediate pad portion 31 along the front guide surface 86A and the rear guide surface 89A which are substantially orthogonal to the forward moving direction of the vehicle. Further, the auxiliary airbag 60 in which the deploying direction is regulated in the early stage of the inflation continues being inflated and deployed in the deploying direction thereafter. Accordingly, it is possible to inhibit the auxiliary airbag 60 from being inflated and deployed in the direction different from the direction between the rear frame portion RF and the intermediate pad portion 31, for example, forward.

In accordance with the second embodiment, in addition to the advantages (1) to (4) mentioned above, the following advantage is obtained.

(5) The front guide member 85 having the front guide surface 86A is arranged near the rear portion of the front side pad portion 32, and the rear guide member 88 having the rear guide surface 89A is arranged near the front portion of the rear frame portion RF. Accordingly, it is possible to reliably guide the auxiliary airbag 60 between the rear frame portion RF and the intermediate pad portion 31 in the early stage of the inflation of the auxiliary airbag 60.

The second embodiment may be modified in the same manner as the items (a) to (g) mentioned above. In addition, the second embodiment may be modified as follows.

(i) The shape, the size (the length), the number and the like of the front guide member 85 and the rear guide member 88 may be modified within a range which satisfies a condition that a first inflating direction of the auxiliary airbag 60 is regulated to the vehicle inner side. For example, the main body portion 86 of the front guide member 85 may be shorter or longer than that indicated in FIG. 15. The same matter is applied to the main body portion 89 of the rear guide member 88.

Figure 15:
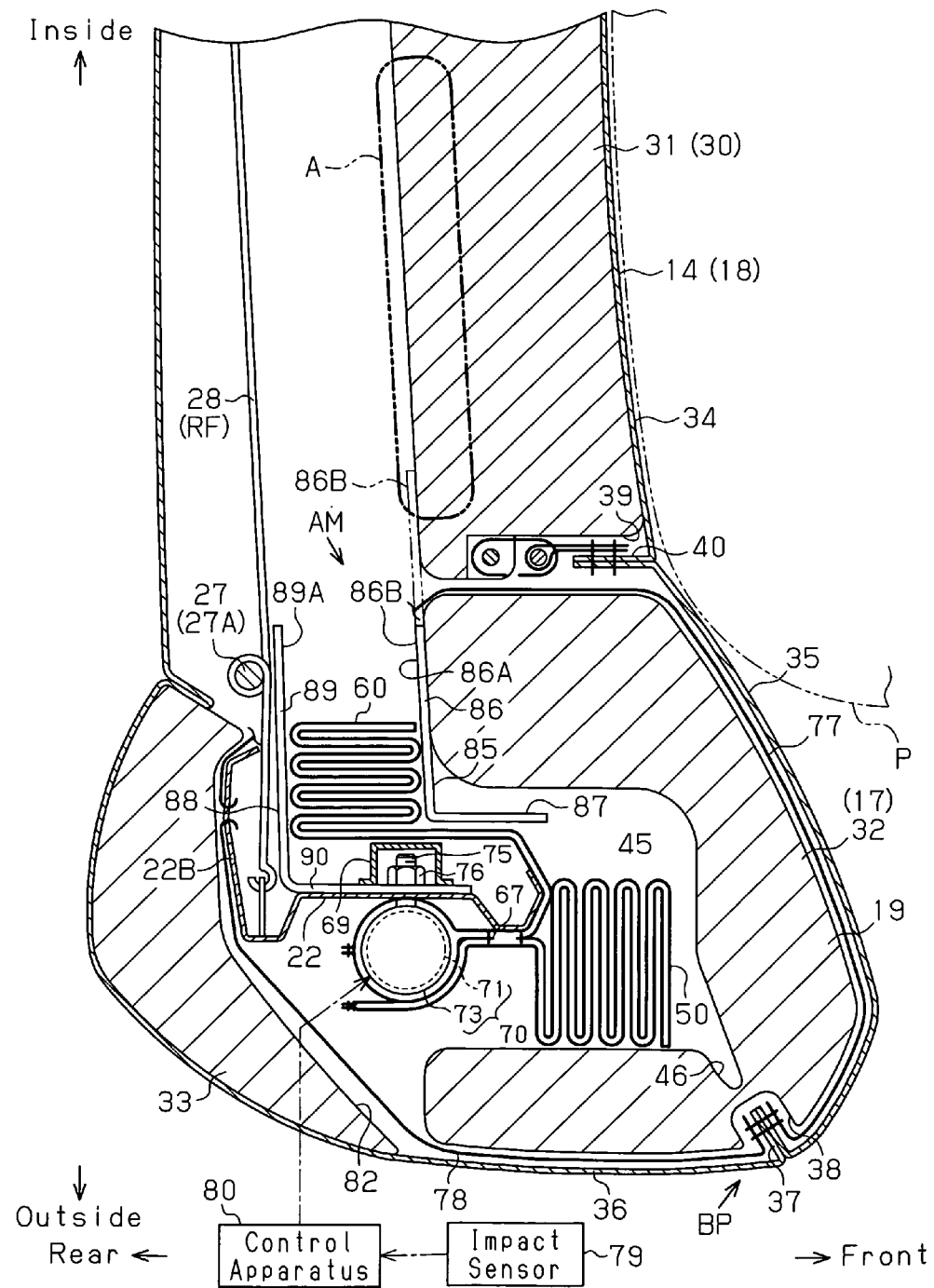
FIG. 15 is a cross-sectional plan view showing an internal structure of an outer side portion of a seat back according to a second embodiment of the present invention.
Figure 16:
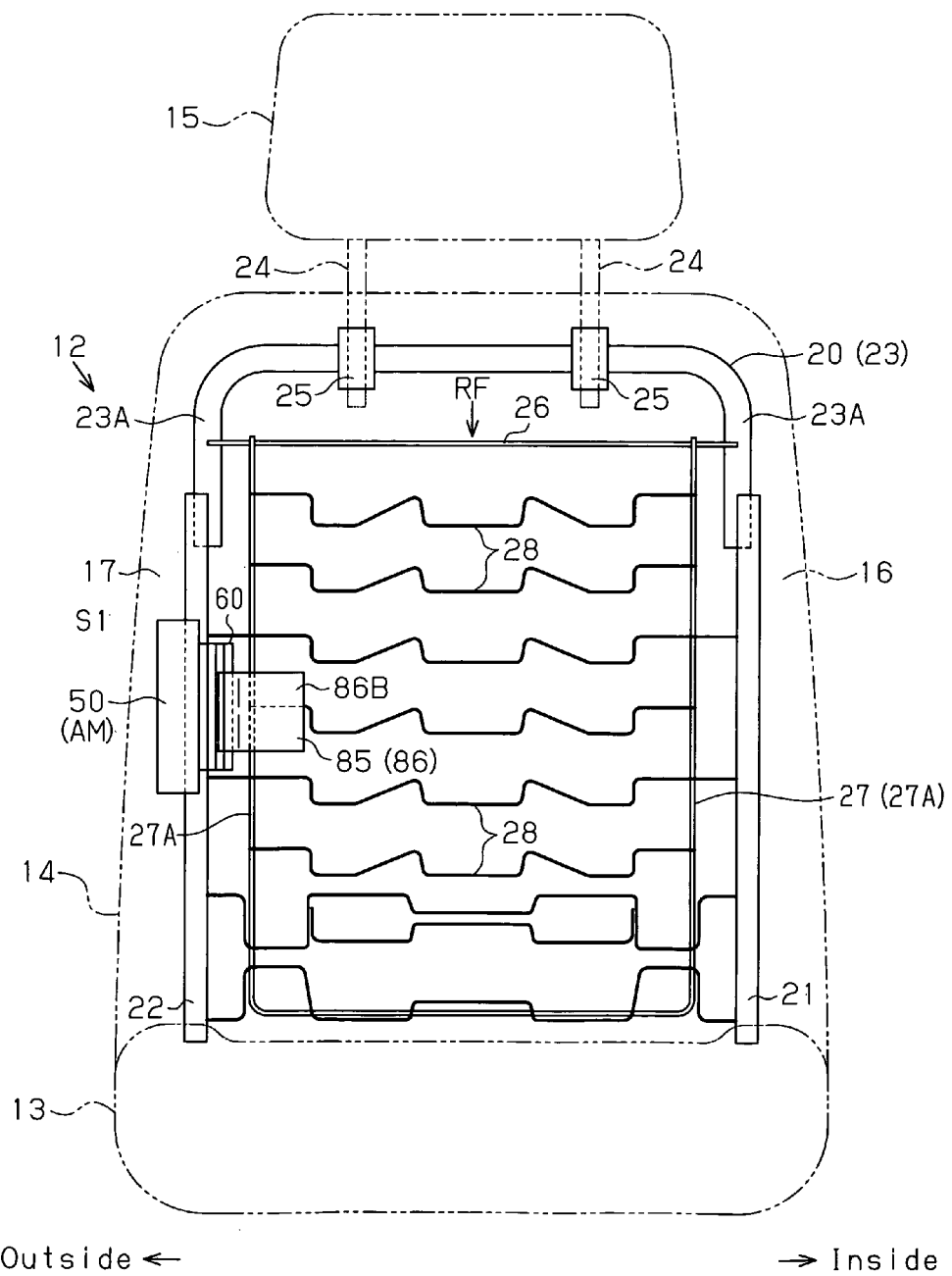
FIG. 16 is a front elevational view showing a seat frame of the seat back, an airbag module, and a front guide member.

In the case that there is no risk of an interference with the stay cloths 77 and 78, the end portion 86B of the main body portion 86 may be extended further to the vehicle inner side than the front side pad portion 32, as shown by a two-dot chain line in FIG. 15, or may be positioned on the rear side of the intermediate pad portion 31. In this case, it is desirable to form at least the main body portion 86 of the front guide member 85 from a non-hard and deformable material. In accordance with this structure, the main body portion 86 tends to be easily deformed while following the intermediate pad portion 31, and does not hinder the deformation of the intermediate pad portion 31 by the auxiliary airbag 60.

The position of the inner end of the main body portion 89 is not limited. The end portion of the main body portion 89 may be extended further to the vehicle inner side than the position shown in FIG. 15, or may be positioned on the rear side of the intermediate pad portion 31. Further, in the case of satisfying the condition that the first inflating direction of the auxiliary airbag 60 is regulated to the vehicle inner side only by the rear guide member 88, the front guide member 85 may be omitted.

Figure 17:
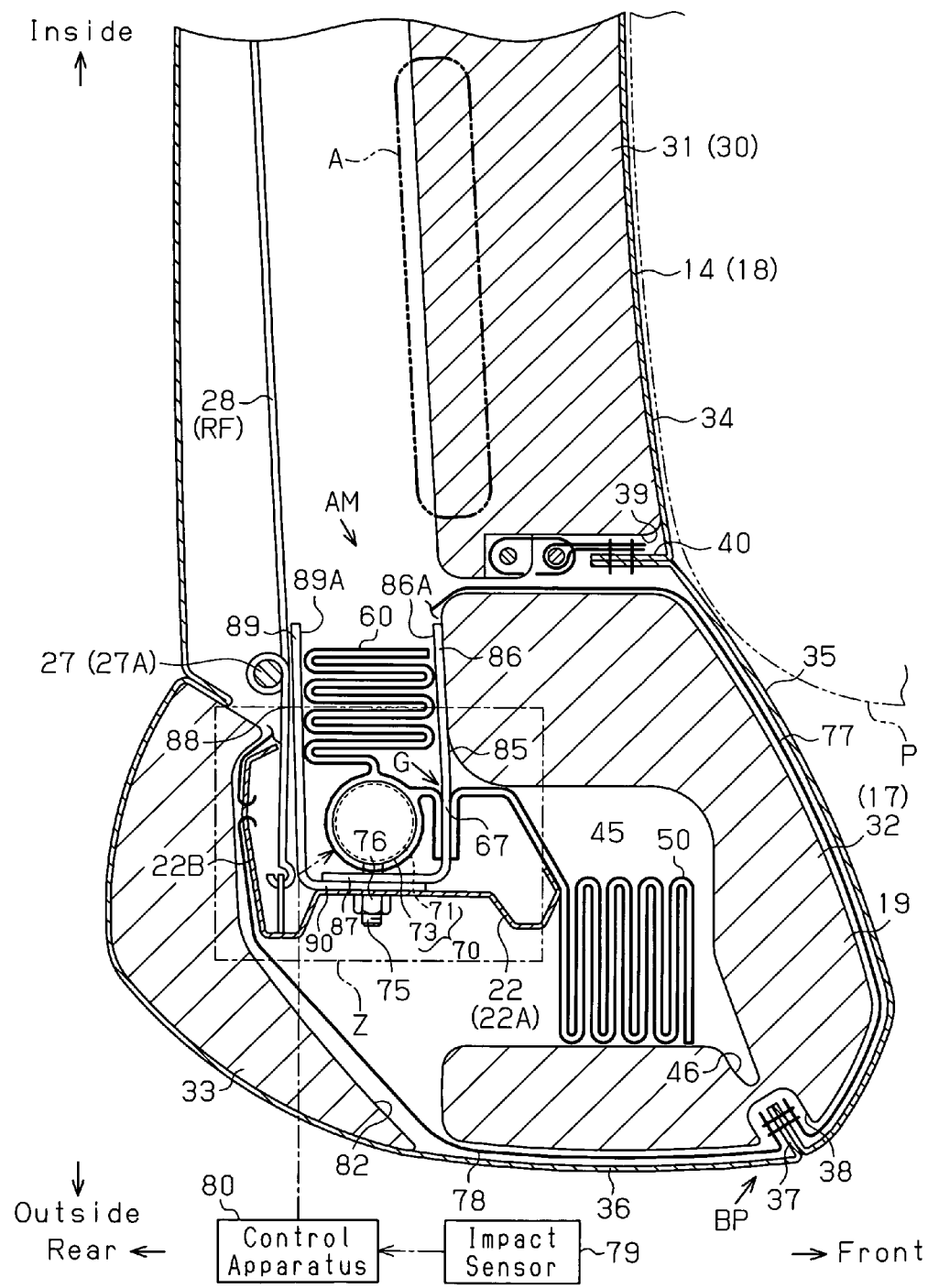
FIG. 17 is a cross-sectional plan view showing an internal structure of an outer side portion of a seat back according to another embodiment.
Figure 18:
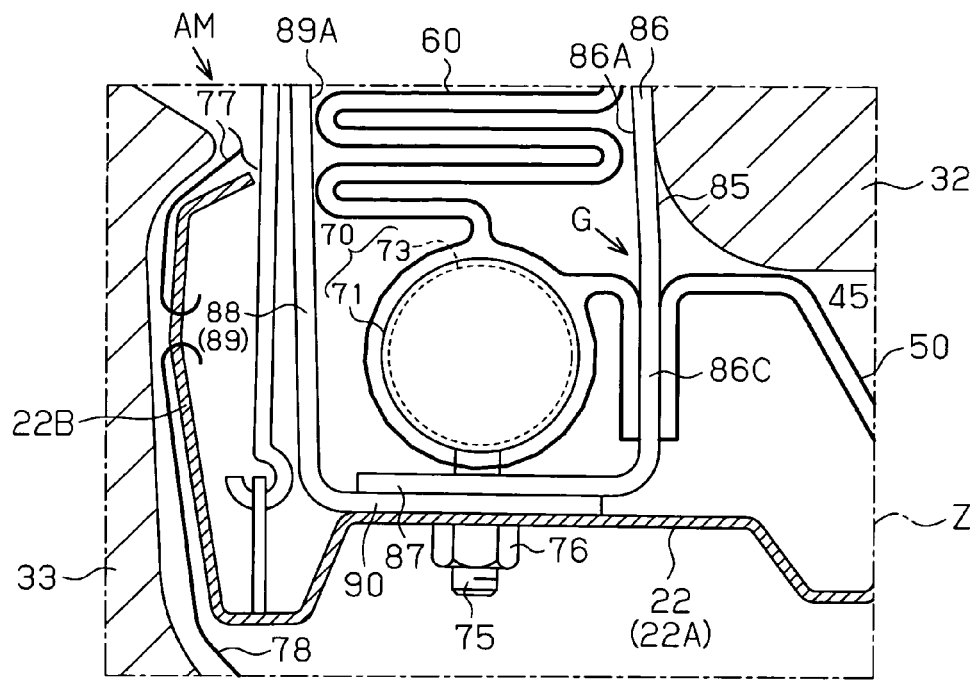
FIG. 18 is a cross-sectional plan view showing portion Z in FIG. 17 in an enlarged manner.
Figure 19:
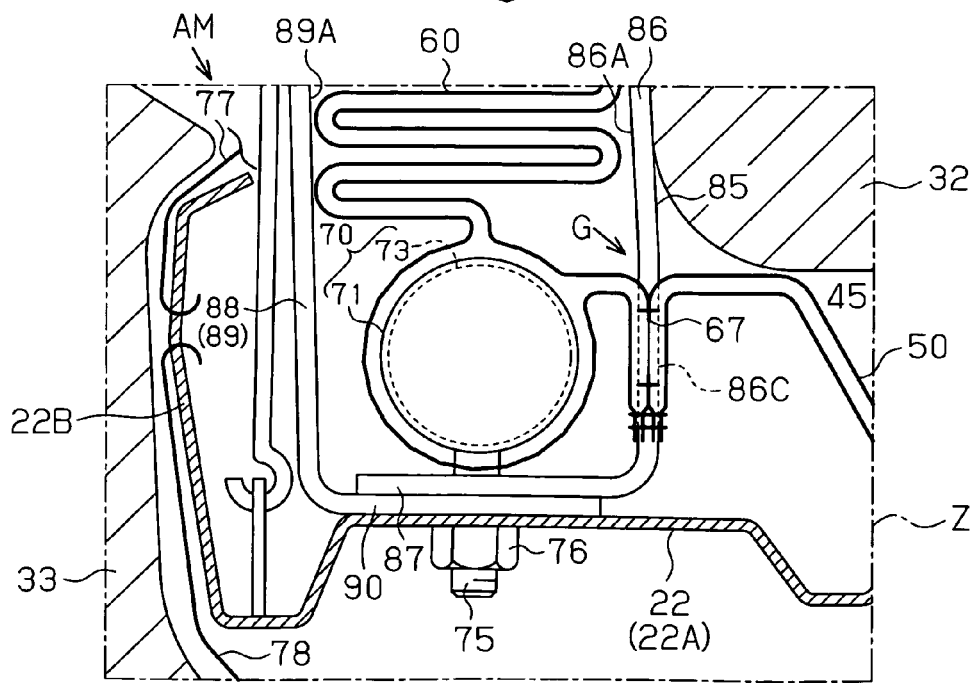
FIG. 19 is a cross-sectional plan view showing an internal structure of an outer side portion of the seat back.

(j) The front guide member 85 may be fixed to other positions than the second embodiment. FIGS. 17 to 19 show one example thereof. FIG. 17 shows an internal structure of the outer side portion 17 of the seat back 14, and is a cross-sectional plan view of the other positions than the communicating hole portion 67. FIG. 18 is a cross-sectional plan view showing a portion Z in FIG. 17 in an enlarged manner. FIG. 19 shows an internal structure of the outer side portion 17, and is a cross-sectional plan view of a position passing through the communicating hole portion 67.

In this embodiment, the inflator assembly 70 is arranged on the vehicle inner side of the outer side frame portion 22. Further, the inflator assembly 70 is fixed to the side wall portion 22A by the bolt 75 and the nut 76. The communicating hole portion 67 between the auxiliary airbag 60 and the main airbag 50 is arranged on the vehicle inner side of the outer side frame portion 22 (refer to FIG. 19).

The bent portion 87 in the front guide member 85 is bent rearward from an outer end of the main body portion 86. A gap G (refer to FIGS. 7A and 7B) is provided at other positions than the communicating hole portion 67 between the main airbag 50 and the auxiliary airbag 60. An outer end 86C of the main body portion 86 is put through the gap G. The position through which the outer end of the main body portion 86 is put may be set to a position between the inner coupling portion 66 and the second inner coupling portion 68, or may be set to a position which is below the inner coupling portion 66 or may be set to a position which is above the second inner coupling portion 68.

The rear surface of the main body portion 86 corresponds to the front guide surface 86A which is substantially orthogonal to the forward moving direction of the vehicle. The bent portion 87 of the front guide member 85 is fixed to the side wall portion 22A by the bolt 75 and the nut 76 of the inflator assembly 70. The front guide member 85 and the rear guide member 88 are fastened (fastened together) to the outer side frame portion 22 together with the inflator assembly 70 and the airbag (the auxiliary airbag 60). In this case, the front guide member 85 and the rear guide member 88 may be constructed as a part of the airbag module AM.

(k) The rear guide member 88 may be fixed to other positions than the second embodiment. For example, the rear guide member 88 may be fixed to the rear frame portion RF in place of the outer side frame portion 22.

Third Embodiment

Figure 20:
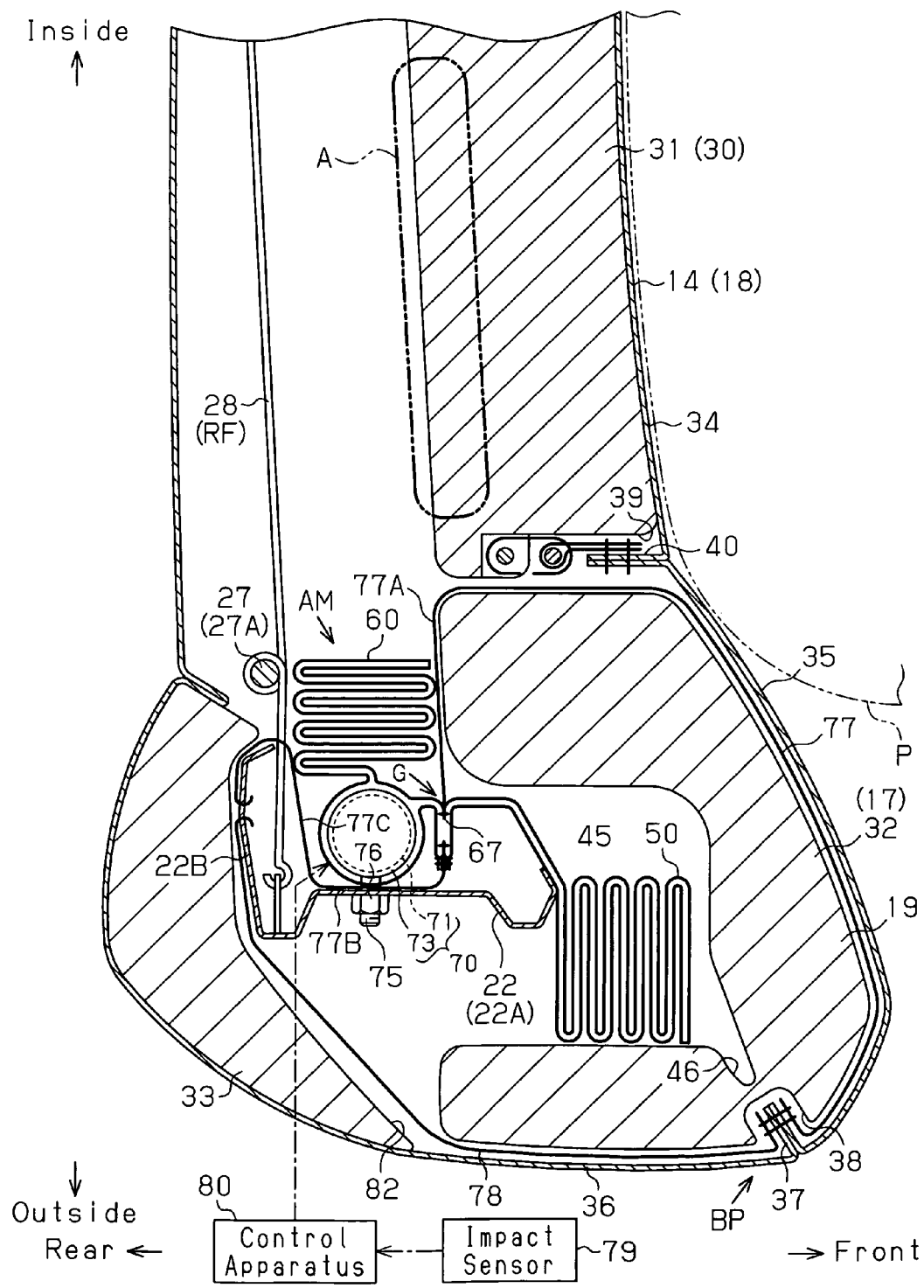
FIG. 20 is a cross-sectional plan view showing an internal structure of an outer side portion of a seat back according to a third embodiment of the present invention.

Next, a description will be given of a third embodiment in accordance with the present invention with reference to FIGS. 20 and 21. The same reference numerals are attached to the same positions, members and the like as those of the first embodiment, and a description thereof will be omitted.

In the third embodiment, the inflator assembly 70 is arranged on the vehicle inner side of the outer side frame portion 22. The inflator assembly 70 is fixed to the side wall portion 22A by the bolt 75 and the nut 76. The communicating hole portion 67 and the gap G between the main airbag 50 and the auxiliary airbag 60 are arranged on the vehicle inner side of the outer side frame portion 22.

A part of the stay cloth 77 is utilized as the guide means, in place of the front guide member 85 and the rear guide member 88. The structure is the same as the first embodiment, in a point that one end portion of the stay cloth 77 is sewn to the covers 35 and 36 in the side sewn portion 37, and a point that the other end portion is locked to the rear wall portion 22B of the outer side frame portion 22. The stay cloth 77 is different from the first embodiment in the following points.

(I) A portion 77A of the stay cloth 77 extends along the vehicle width direction on the front side of the folded auxiliary airbag 60, and is put through the gap G between the main airbag 50 and the auxiliary airbag 60. In more detail, the main airbag 50 and the auxiliary airbag 60 are coupled by the inner coupling portion 66 and the second inner coupling portion 68 in the airbag module AM. Further, the portion 77A of the stay cloth 77 is put through a passage 100 corresponding to a slight space between the inner coupling portion 66 and the second inner coupling portion 68. The inner coupling portion 66 and the second inner coupling portion 68 position the stay cloth 77 in the gap G.

(II) A portion 77B of the stay cloth 77 is fixed to the side wall portion 22A of the outer side frame portion 22 together with the auxiliary airbag 60 by the bolt 75 and the nut 76 of the inflator assembly 70.

(III) A portion 77C of the stay cloth 77 extends substantially along the vehicle width direction on the rear side of the folded auxiliary airbag 60.

In the third embodiment, the deploying direction of the auxiliary airbag 60 is regulated to the vehicle inner side by the portion 77A of the stay cloth 77, at a time when the auxiliary airbag 60 is inflated by the gas feed, and the folded state of the auxiliary airbag 60 begins to be dissolved (deployed).

At this time, the stay cloth 77 is positioned by the inner coupling portion 66 and the second inner coupling portion 68, and the motion of the stay cloth 77 is regulated. Accordingly, it is possible to reliably prevent an unintended motion of the auxiliary airbag 60 caused by a dispersion of the folding, a dispersion of the assembling or the like, by the stay cloth 77 positioned as mentioned above.

The stay cloth 77 is made of a material having a low extendability. The stay cloth 77 is less subject to the inflation of the auxiliary airbag 60 or the like, and is hardly extended. The auxiliary airbag 60 is reliably guided to the portion between the rear frame portion RF and the intermediate pad portion 31 in the early stage of the inflation of the auxiliary airbag 60, on the basis of the regulation in the deploying direction of the auxiliary airbag 60 by the stay cloth 77. The auxiliary airbag 60 in which the deploying direction is regulated in the early stage of the inflation goes on being inflated and deployed in the deploying direction thereafter. Accordingly, it is possible to inhibit the auxiliary airbag 60 from being inflated and deployed in other directions than the portion between the rear frame portion RF and the intermediate pad portion 31. In this case, the rear frame portion RF regulates the deploying direction in the early state of the inflation of the auxiliary airbag 60.

Even if the position of a part of the stay cloth 77 is changed as mentioned above, the original function of the stay cloth 77 is not deteriorated. Therefore, in accordance with the third embodiment, the following advantage is obtained in addition to the same advantages as the advantages (1) to (3) mentioned above.

(6) The existing stay cloth 77 is utilized as the band-like member, and the portion 77A of the stay cloth 77 extends in the vehicle width direction, and is put through the gap G (the passage 100) between the auxiliary airbag 60 and the main airbag 50. Accordingly, it is possible to regulate the deploying direction in the early stage of the inflation of the auxiliary airbag 60. Further, the original function of the stay cloth 77 for assisting the breakage of the front side pad portion 32 by the main airbag 50 is not deteriorated. On the basis of this, it is unnecessary to independently provide the guide means for regulating the deploying direction in the early stage of the inflation of the auxiliary airbag 60 in addition to the stay cloth 77.

The third embodiment may be modified in the same manner as the items (a) to (g) mentioned above. In addition, the third embodiment may be modified as follows.

(l) Since the stay cloth 77 is fixed to the outer side frame portion 22 by the bolt 75 and the nut 76, the portion 77C on the rear side of the fixed position of the stay cloth 77 may be omitted.

(m) The stay cloth 77 may be fixed to the outer side frame portion 22 at the position in which the inflator assembly 70 and the auxiliary airbag 60 are not fixed to the side frame portion 22.

As shown by a solid line in FIG. 22, the stay cloth 77 may be segmented into a portion 77A and a portion 77B, and the respective portions 77A and 77B may be coupled to the main airbag 50 and the auxiliary airbag 60 by the inner coupling portion 66. In the case that the inner coupling portion 66 is sewn by using the sewing thread, each of the portions 77A and 77B of the stay cloth 77 is sewn together with the base fabric sheets 52 and 61 around the communicating hole portion 67 in the process of manufacturing the airbag module AM. In this case, the second inner coupling portion 68 may be omitted.

Further, in the case that the second inner coupling portion 68 is not provided, and the main airbag 50 and the auxiliary airbag 60 are coupled only by the inner coupling portion 66, the position at which the stay cloth 77 is put through the gap G is not particularly limited as long as the position is the other positions than the inner coupling portion 66, as shown by a two-dot chain line in FIG. 22.

Fourth Embodiment

Figure 23:
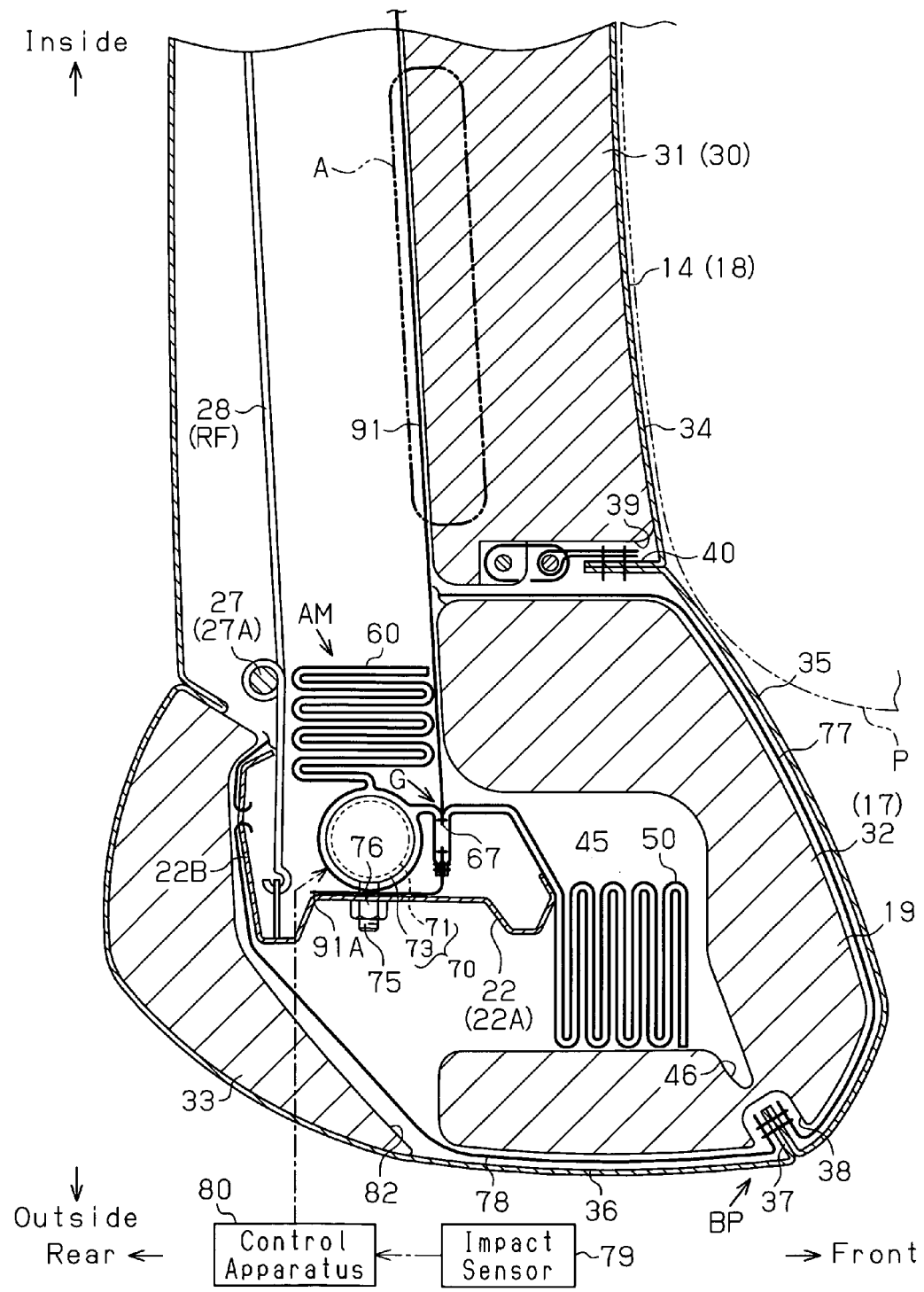
FIG. 23 is a cross-sectional plan view showing an internal structure of an outer side portion of a seat back according to a fourth embodiment of the present invention.
Figure 24:
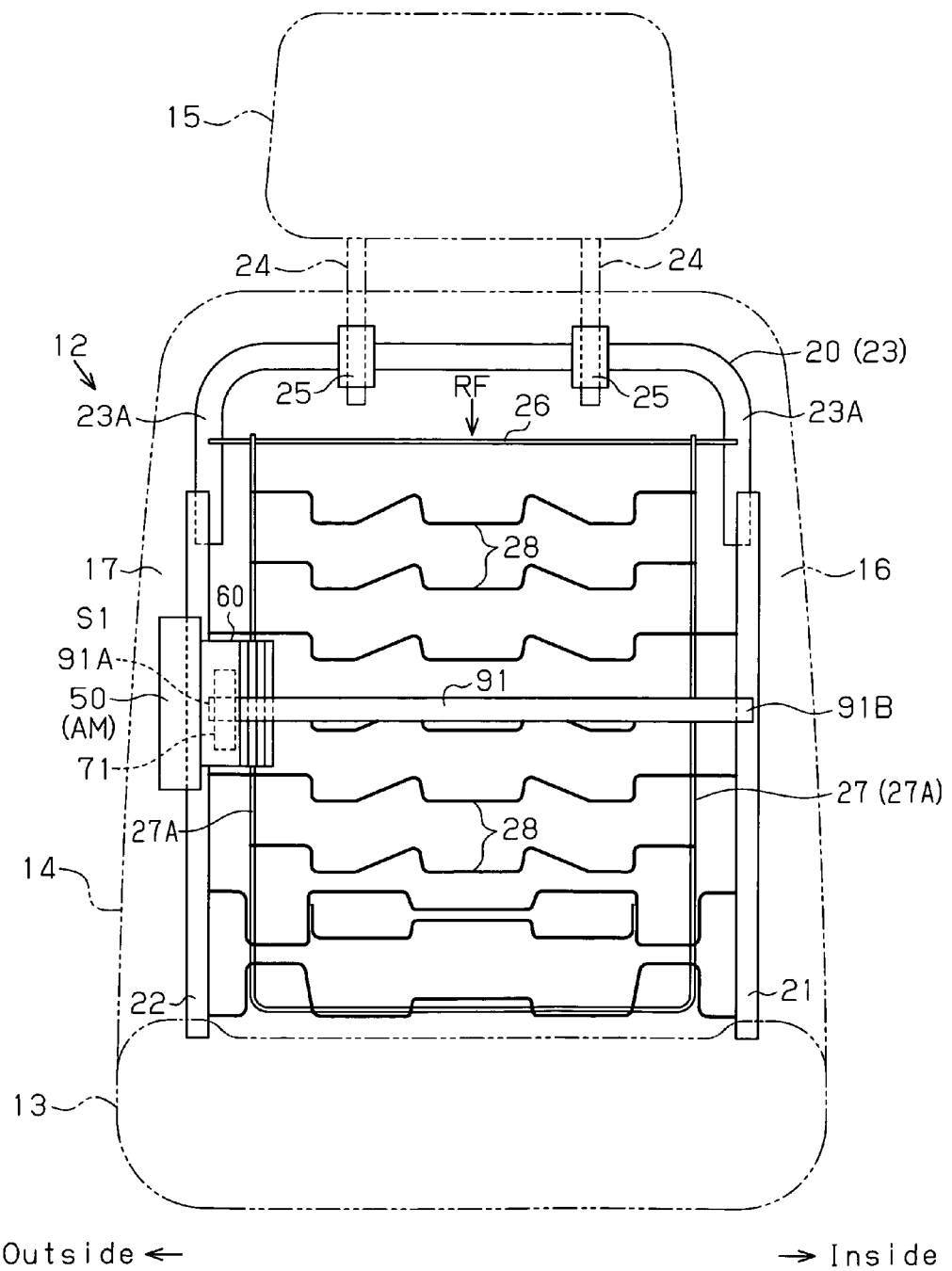
FIG. 24 is a front elevational view showing a seat frame of a seat back, an airbag module, and a band-like member.

Next, a description will be given of a fourth embodiment in accordance with the present invention with reference to FIGS. 23 and 24. The same reference numerals are attached to the same positions, members and the like as those of the third embodiment, and a description thereof will be omitted.

In the fourth embodiment, a band-like member 91 made of a material having a low expandability is used as the guide means independently from the stay cloth 77. At least a part of the band-like member 91 extends along the vehicle width direction on the front side of the folded auxiliary airbag 60, and is put through the passage 100 corresponding to the gap G between the main airbag 50 and the auxiliary airbag 60. An outer end 91A of the band-like member 91 is fixed to the side wall portion 22A of the outer side frame portion 22 together with the inflator assembly 70 and the auxiliary airbag 60 by the bolt 75 and the nut 76. An inner end 91B of the band-like member 91 is fixed to the inner side frame portion 21.

In the fourth embodiment, the deploying direction of the auxiliary airbag 60 is regulated to the vehicle inner side by the band-like member 91 at a time when the auxiliary airbag 60 is inflated by the gas feed, and the folded state of the auxiliary airbag 60 begins to be dissolved (deployed). In other words, the band-like member 91 is less subject to the inflation of the airbag 60 or the like, and is hard to be extended. Accordingly, the deploying direction of the auxiliary airbag 60 is regulated by the band-like member 91. Therefore, the auxiliary airbag 60 is reliably guided to the portion between the rear frame portion RF and the intermediate pad portion 31 in the early stage of the inflation of the auxiliary airbag 60. Further, the auxiliary airbag 60 in which the deploying direction is regulated in the early stage of the inflation continues being inflated and deployed in the deploying direction thereafter. Accordingly, it is possible to inhibit the auxiliary airbag 60 from being inflated and deployed in other directions than the portion between the rear frame portion RF and the intermediate pad portion 31. In this case, the rear frame portion RF regulates the deploying direction of the auxiliary airbag 60.

Therefore, in accordance with the fourth embodiment, the following advantage (6A) corresponding to the advantage (6) is obtained in addition to the advantages (1) to (3) and (6) mentioned above.

(6A) The band-like member 91 extends along the vehicle width direction, and is put through the gap G (the passage 100) between the auxiliary airbag 60 and the main airbag 50. Further, the outer end 91A of the band-like member 91 is fixed to the outer side frame portion 22, and the inner end 91B is fixed to the inner side frame portion 21. Accordingly, the deploying direction of the auxiliary airbag 60 is regulated by the band-like member 91, at a time when the auxiliary airbag 60 is inflated by the gas, and the folded state of the auxiliary airbag 60 begins to be dissolved. In other words, it is possible to reliably guide the auxiliary airbag 60 to the portion between the rear frame portion RF and the intermediate pad portion 31, by the band-like member 91.

The fourth embodiment may be modified in the same manner as the items (a) to (g) mentioned above. In addition, the fourth embodiment may be modified as follows.

(n) The band-like member 91 may be fixed to the outer side frame portion 22 at the other positions than the position where the inflator assembly 70 and the auxiliary airbag 60 are fixed to the outer side frame portion 22.

Fifth Embodiment

Figure 25:
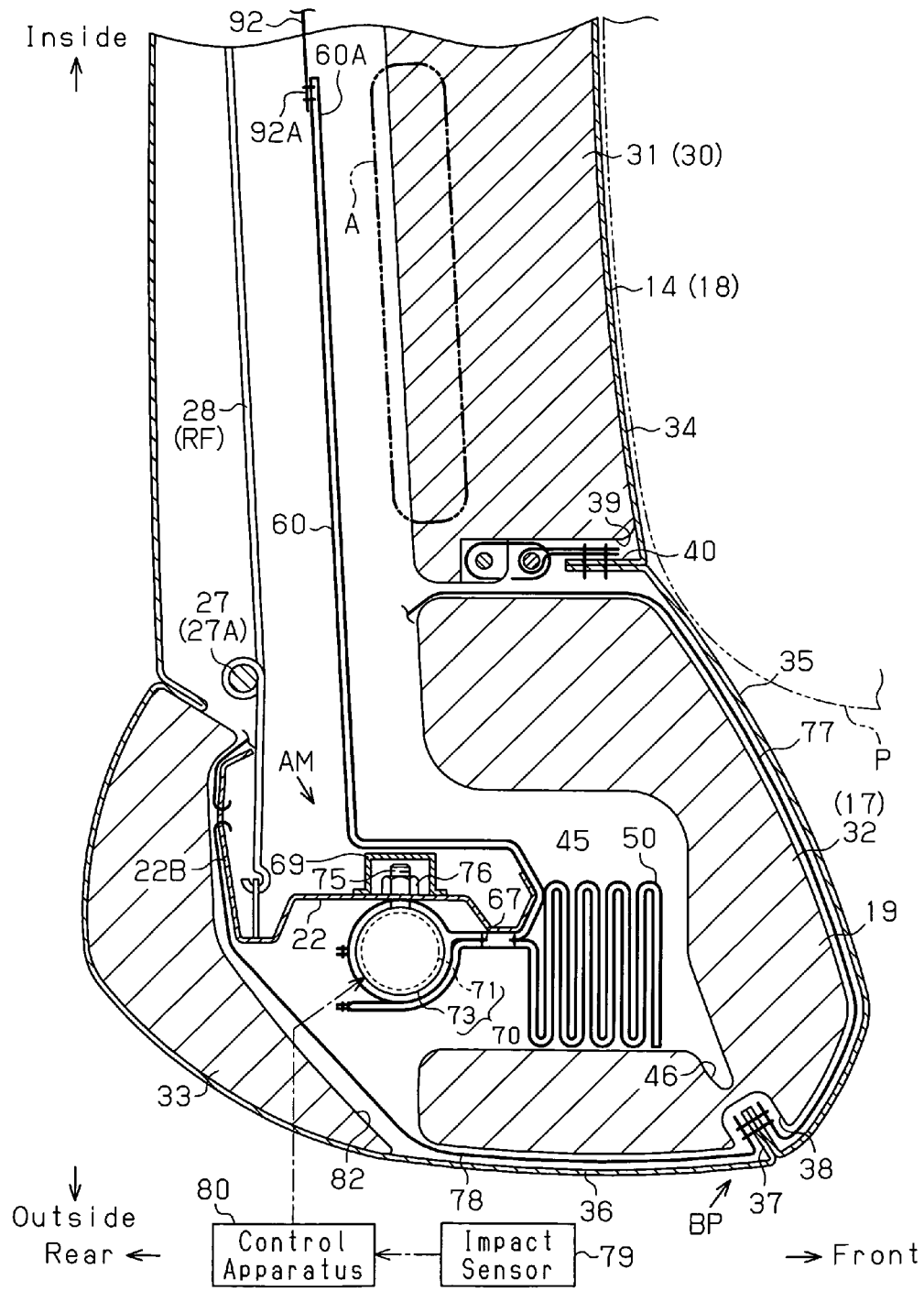
FIG. 25 is a cross-sectional plan view showing an internal structure of an outer side portion of a seat back according to a fifth embodiment of the present invention.
Figure 26:
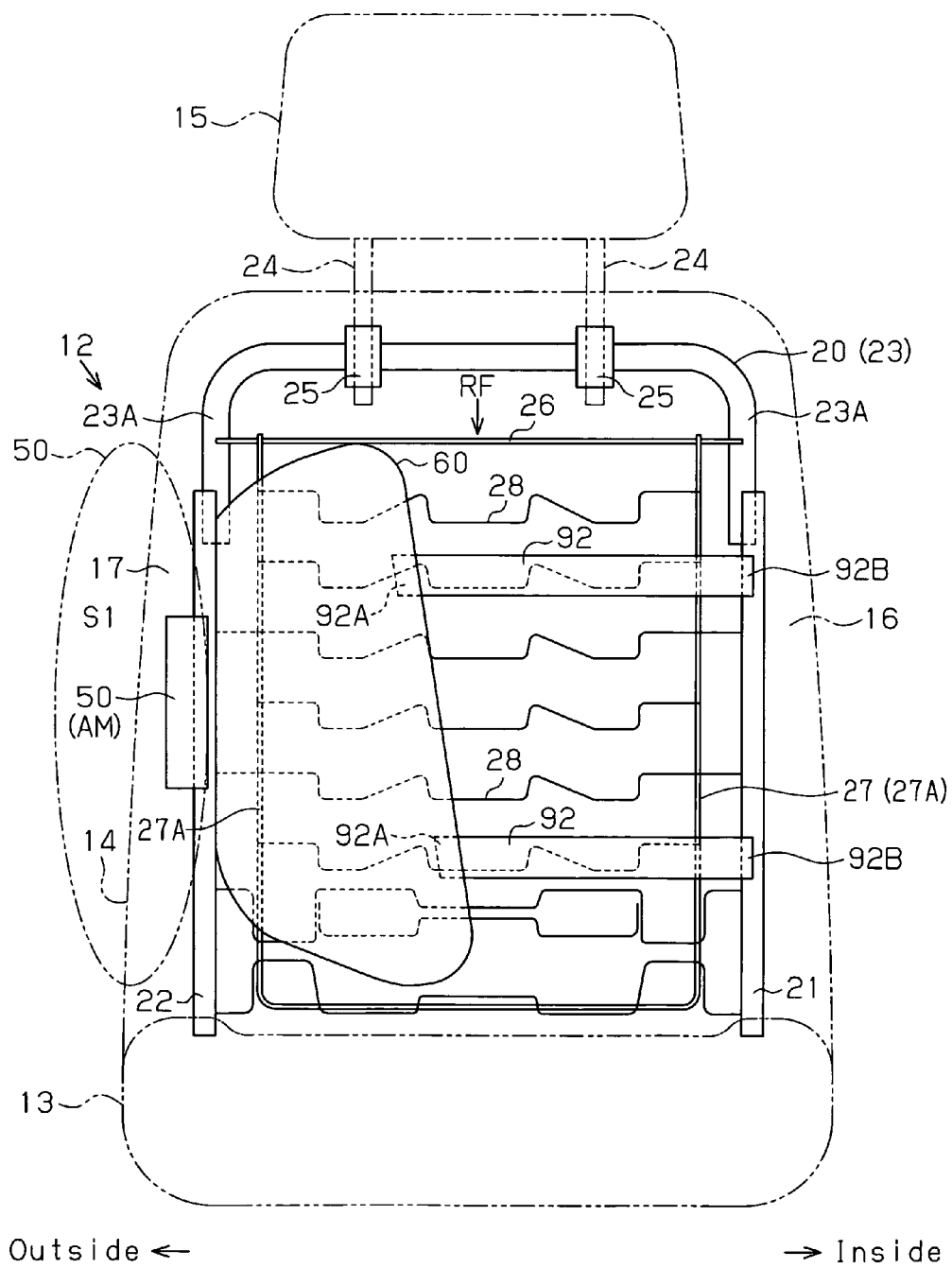
FIG. 26 is a front elevational view showing a seat frame of a seat back, an airbag module, and a band-like member.

Next, a description will be given of a fifth embodiment in accordance with the present invention with reference to FIGS. 25 and 26. The same reference numerals are attached to the same portions, members and the like as those of the first embodiment, and a description thereof will be omitted.

In the fifth embodiment, the auxiliary airbag 60 is arranged between the rear frame portion RF and the intermediate pad portion 31 in advance in a state of being deployed, unlike the first to fourth embodiments. Further, a band-like member 92 is provided as a means for retaining the auxiliary airbag 60 in the deployed state, within the seat back 14. The band-like member 92 is constituted by an extended plate extending along the vehicle width direction. The number of the band-like member 92 may be set to one, but it is desirable to use a plurality of band-like members 92 for retaining in a stably deployed state. In the present embodiment, two band-like members 92 and 92 are arranged so as to be spaced from each other in the vertical direction.

The outer end 92A of each of the band-like members 92 is coupled to the inner end 60A of the auxiliary airbag 60. The coupling method in this case may be constituted by the seam by the sewing thread, or the adhesion by the adhesive agent. Further, the inner end 92B of each of the band-like members 92 is coupled to the seat frame 20 at a position on the vehicle inner side than the inner end 60A of the auxiliary airbag 60. In the present embodiment, the inner side frame portion 21 is the position on the vehicle inner side. The inner end 92B of each of the band-like members 92 is fixed to the inner side frame portion 21.

In the fifth embodiment, the auxiliary airbag 60 is retained in a state of being deployed by two band-like members 92 arranged in an upper portion and a lower portion. Accordingly, it is possible to inhibit the auxiliary airbag 60 from being assembled at the position which is deviated from the suitable position within the seat back 14 at a time of assembling the auxiliary airbag 60 in the seat back 14. Further, there is a case that a leg of the occupant P touches the rear surface of the seat back 14 in the front seat, at a time when the occupant P in the rear seat moves up and down. In detail, there is a case that the leg of the occupant P touches a portion between the adjacent wire frame portions 28. In this case, a force moving the auxiliary airbag 60 in the vehicle width direction is applied to the auxiliary airbag 60. In this regard, in accordance with the present embodiment, the auxiliary airbag 60 is retained in a state of being deployed by a pair of band-like members 92. Accordingly, it is possible to inhibit the auxiliary airbag 60 from being deviated from the suitable position within the seat back 14.

If the gas jetted out of the inflator 71 flows into the auxiliary airbag 60, the auxiliary airbag 60 is inflated at the suitable position between the rear frame portion RF and the intermediate pad portion 31. Further, the auxiliary airbag 60 reliably presses the position A which is close to the outer side portion 17 of the intermediate pad portion 31, and inflates the intermediate pad portion 31 forward.

In accordance with the fifth embodiment, the following advantages can be obtained in addition to the advantages (1) to (3) mentioned above.

(7) The portion in which the auxiliary airbag 60 is folded comes to a resistance at a time when the auxiliary airbag 60 is inflated and deployed. In this regard, in accordance with the fifth embodiment, the auxiliary airbag 60 is not folded, and is arranged between the rear frame portion RF and the intermediate pad portion 31 in the previously deployed state. Accordingly, the resistance generated at a time of inflating and deploying is smaller than that generated in the folded state. Accordingly, it is possible to deploy the auxiliary airbag 60 in a short time.

(8) The auxiliary airbag 60 is arranged between the rear frame portion RF and the intermediate pad portion 31 in the deployed state. Further, the inner end 60A of the auxiliary airbag 60 is connected to the inner side frame portion 21 positioned on the vehicle inner side than the inner end 60A by the band-like member 92. Accordingly, it is possible to inhibit the auxiliary airbag 60 from being assembled at the position which is deviated from the suitable position within the seat back 14. Further, it is possible to inhibit the auxiliary airbag 60 in the front seat from being deviated from the suitable position within the seat back 14, at a time when the occupant P in the rear seat moves up and down.

The fifth embodiment may be modified in the same manner as the items (a) to (g) mentioned above. In addition, the fifth embodiment may be modified as follows. With regard to (c), however, only the main airbag 50 may be modified.

(o) It is necessary to couple the inner end 92B of the band-like member 92 to the seat frame 20 which is positioned on the vehicle inner side than the inner end 60A of the auxiliary airbag 60. Within the range satisfying this condition, the end portion 92B of the band-like member 92 may be coupled, for example, to the wire frame portion 28 constructing the rear frame portion RF.

Sixth Embodiment

Figure 27:
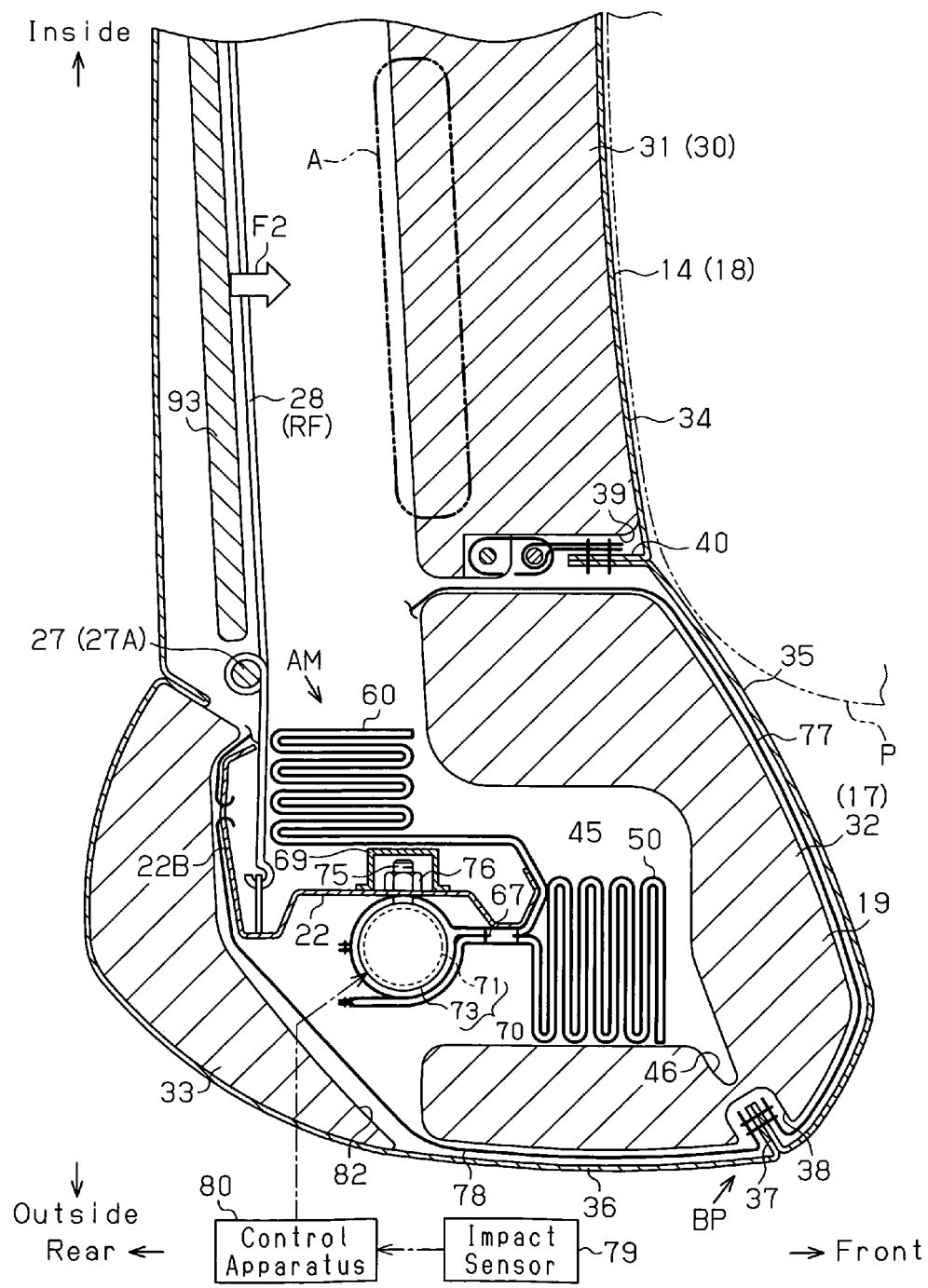
FIG. 27 is a cross-sectional plan view showing an internal structure of an outer side portion of a seat back according to a sixth embodiment of the present invention.
Figure 28:
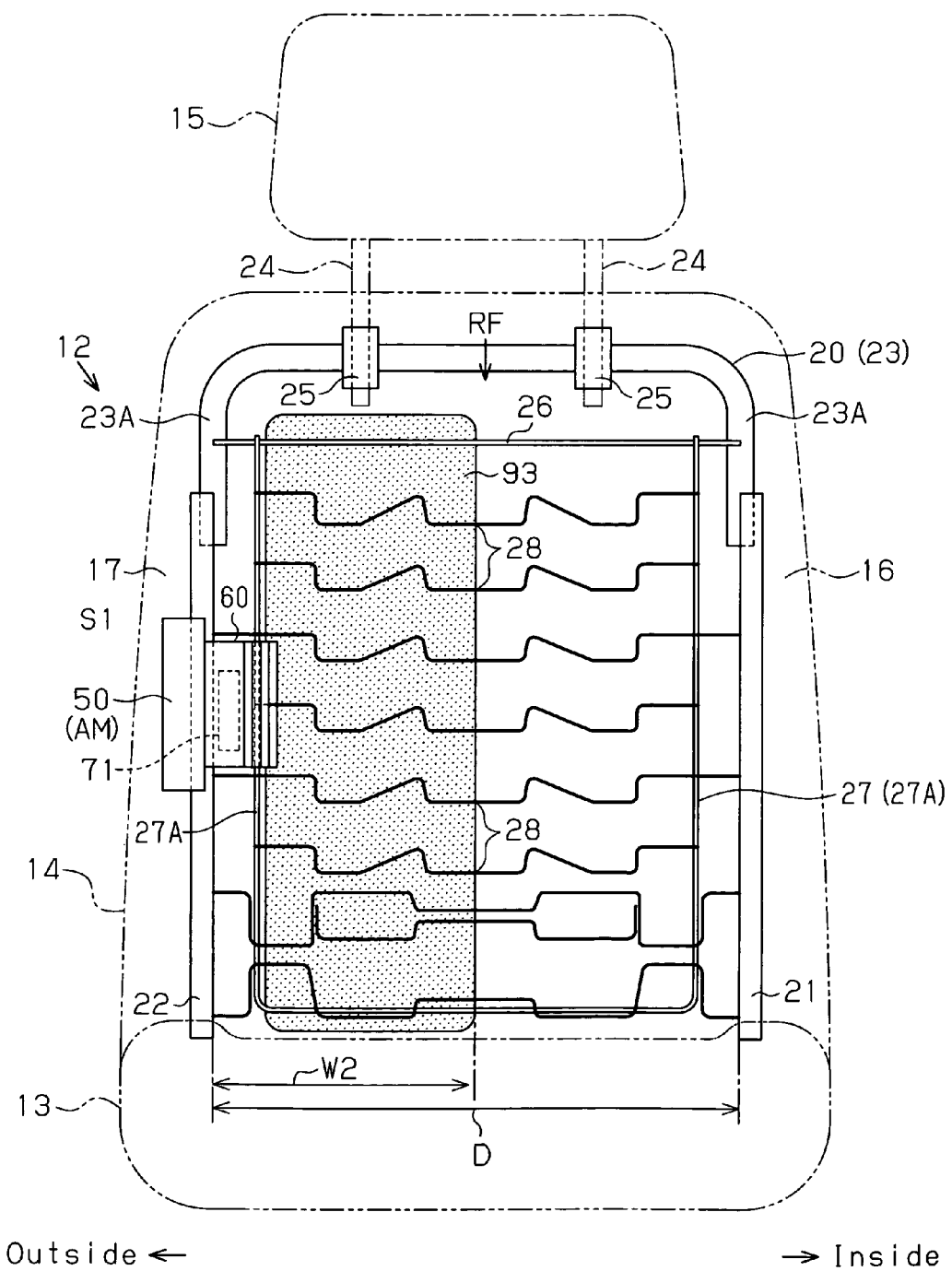
FIG. 28 is a front elevational view showing a seat frame of a seat back, an airbag module, and a pressure receiving plate.

Next, a description will be given of a sixth embodiment in accordance with a sixth embodiment of the present invention with reference to FIGS. 27 and 28. The same reference numerals are attached to the same portions, members and the like as those of the first embodiment, and a description thereof will be omitted.

In the sixth embodiment, a pressure receiving plate 93 made of a synthetic resin material is arranged on the rear side of the rear frame portion RF within the seat back 14. The rigidity of the pressure receiving plate 93 is higher than the wire frame portion 28, and is lower than a general metal plate material. The pressure receiving plate 93 may be somewhat flexed, but, the flexing amount is smaller than the wire frame portion 28. The pressure receiving plate 93 generates a forward reaction force F2 by being exposed to the gas pressure within the auxiliary airbag 60. The width W2 of the pressure receiving plate 93 is about one half or somewhat smaller than the interval D between the side frame portions 21 and 22. The height of the pressure receiving plate 93 is almost the same as that of the seat frame 20 or somewhat lower than that.

In the sixth embodiment, when the gas is fed from the inflator 71 and the auxiliary airbag 60 is inflated, the pressure of the gas within the auxiliary airbag 60 is received by the pressure receiving plate 93, so that the forward reaction force F2 is generated. The position A close to the outer side portion 17 of the intermediate pad portion 31 is pressed by the reaction force F2, and is reliably inflated forward. Accordingly, the back of the occupant P reclining against the seat back 14 is pushed diagonally forward, and moves to the vehicle inner side.

Therefore, in accordance with the sixth embodiment, the following advantage is obtained in addition to the advantages (1) to (4).

(9) The pressure receiving plate 93 is arranged on the rear side of the rear frame portion RF. The forward reaction force F2 is generated by the pressure receiving plate 93. Accordingly, the position A close to the outer side portion 17 of the intermediate pad portion 31 is pressed, and is reliably inflated forward, and the occupant P is reliably moved to the vehicle inner side.

The sixth embodiment may be modified in the same manner as the items (a) to (h) mentioned above. In addition, the sixth embodiment may be modified as follows.

(p) The installation of the pressure receiving plate 93 in the sixth embodiment may be combined with the second to fifth embodiments in addition to the first embodiment. In this case, the embodiment may be modified in the same manner as the items (i) to (o) mentioned above.

Seventh Embodiment

Figure 29:
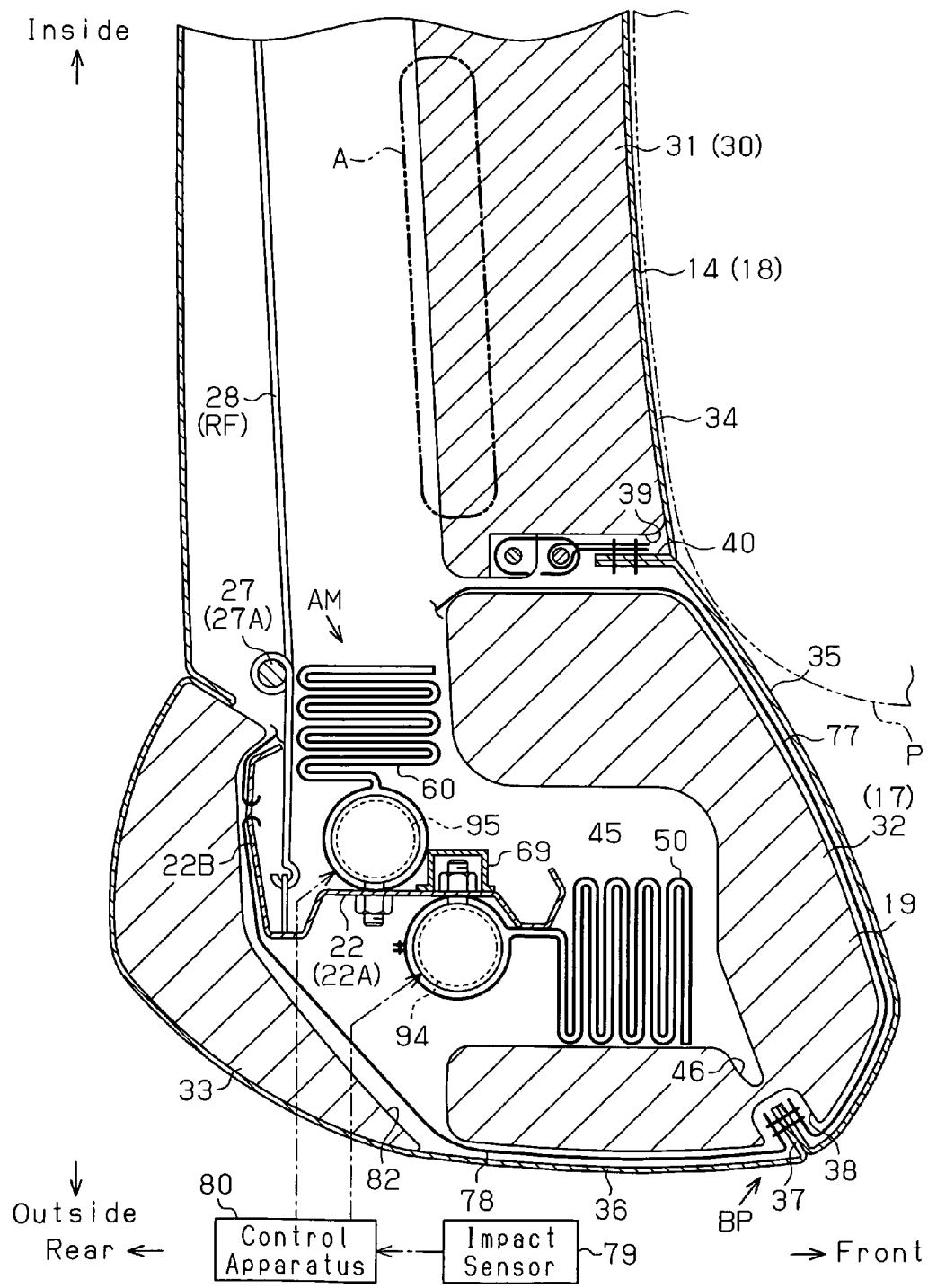
FIG. 29 is a cross-sectional plan view showing an internal structure of an outer side portion of a seat back according to a seventh embodiment of the present invention.

Next, a description will be given of a seventh embodiment in accordance with the present invention with reference to FIG. 29. The same reference numerals are attached to the same portions, members and the like as those of the first embodiment, and a description thereof will be omitted.

In the seventh embodiment, the main airbag 50 and the auxiliary airbag 60 are arranged in an independent state from each other. A main inflator 94 is arranged in the main airbag 50, and an auxiliary inflator 95 is arranged in the auxiliary airbag 60. The main inflator 94 is arranged on the vehicle outer side of the outer side frame portion 22, and is fixed to the side wall portion 22A of the outer side frame portion 22. The auxiliary inflator 95 is arranged on the vehicle inner side of the outer side frame portion 22, and is fixed to the side wall portion 22A of the outer side frame portion 22.

Actuation of the main inflator 94 and the auxiliary inflator 95 is controlled by the control apparatus 80 on the basis of the detected signal from the impact sensor 79. In this case, the actuation of the auxiliary inflator 95 is first started, and the actuation of the main inflator 94 is started after the auxiliary inflator 95.

In the seventh embodiment, if the impact is applied to the vehicle from a side, the gas is first fed to the auxiliary airbag 60 from the auxiliary inflator 95. Due to this gas, the auxiliary airbag 60 begins to be inflated between the rear frame portion RF and the intermediate pad portion 31. Then, the position A close to the outer side portion 17 of the intermediate pad portion 31 is pressed by the auxiliary airbag 60, and is inflated forward. As a result, the back of the occupant P reclining against the seat back 14 is pushed diagonally forward, and is moved to the vehicle inner side. Accordingly, the space S1 between the body side portion 11 and the occupant P is expanded in the vehicle width direction.

Further, the gas jetted out of the main inflator 94 is fed to the main airbag 50 after the actuation of the auxiliary inflator 95. Due to this gas, the main airbag 50 is inflated while dissolving the folded state (deploying), and shoots out from the outer side portion 17 of the seat back 14. Further, the main airbag 50 is inflated and deployed forward in the space S1 expanded as mentioned above, and restrains the occupant P.

Therefore, in accordance with the seventh embodiment, the following advantage is obtained in addition to the advantages (1) and (4).

(10) The main airbag 50 and the auxiliary airbag 60 are arranged in a state of being independent from each other. Further, the main inflator 94 is arranged in the main airbag 50, and the auxiliary inflator 95 is arranged in the auxiliary airbag 60. Further, the inflators 94 and 95 are activated in the order of the auxiliary inflator 95→the main inflator 94. Accordingly, the gas jetted out of the auxiliary inflator 95 is first fed to the auxiliary airbag 60. As a result, the auxiliary airbag 60 begins to be inflated at an earlier timing than the main airbag 50. Therefore, it is possible to inflate and deploy the main airbag 50 after reliably expanding the space S1 between the body side portion 11 and the occupant P in the vehicle width direction.

The seventh embodiment may be modified in the same manner as the items (a) to (h) mentioned above. In addition, the seventh embodiment may be modified as follows.

(q) The seventh embodiment may be combined with the second to sixth embodiments in addition to the first embodiment. In this case, the embodiment may be modified in the same manner as the items (i) to (p) mentioned above.

Eighth Embodiment

Next, a description will be given of an eighth embodiment in accordance with the present invention with reference to FIGS. 30 to 35. The same reference numerals are attached to the same portions, members and the like as those of the first embodiment, and a description thereof will be omitted.

As shown in FIGS. 30 to 32C, the main airbag 50 and the auxiliary airbag 60 are provided with a regulating means regulating the deployment at least in the early stage of the inflation of the auxiliary airbag 60 so as to be directed to a portion near a boundary portion (the groove portion 39) between the intermediate portion 18 and the outer side portion 17 of the seat back 14. The regulating means is provided with coupling portions 103 and 104 for coupling the inflating portion of the auxiliary airbag 60 to the main airbag 50.

The coupling portions 103 and 104 are respectively provided in correspondence to both ends of the inflator 71. The coupling portions 103 and 104 are respectively provided over both of the proximal ends 50A and 60A of the main airbag 50 and the auxiliary airbag 60 and portions near the proximal ends 50A and 60A. An axis L1 of the inflator 71 extends along the vertical direction. Accordingly, "both upper and lower ends" correspond to "both ends in axial direction".

Figure 30:
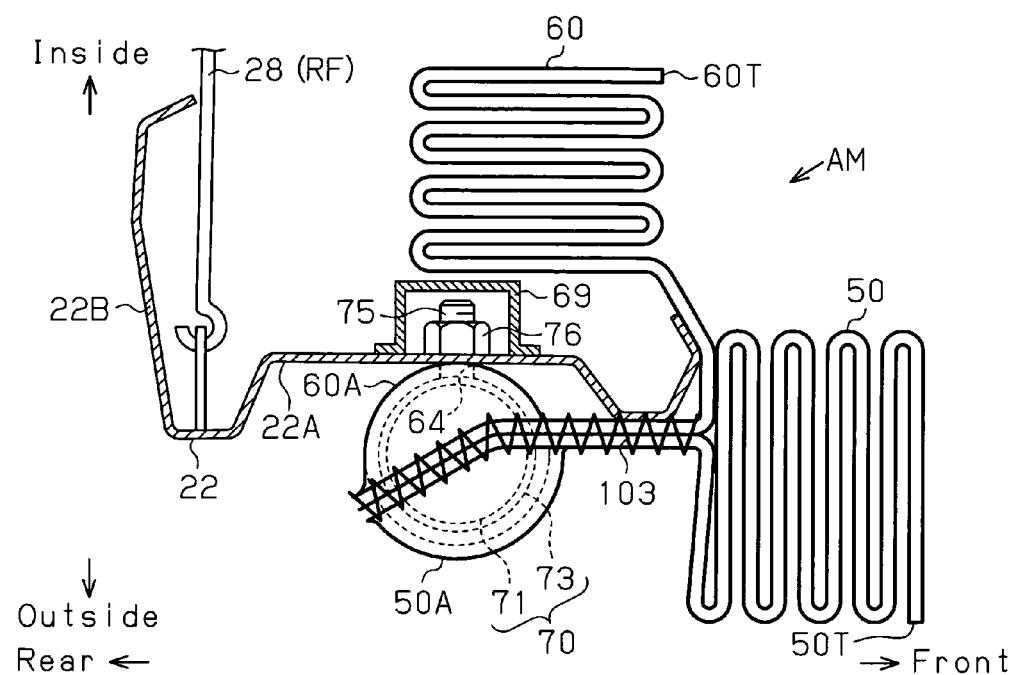
FIG. 30 is a cross-sectional plan view explaining a coupling portion according to an eighth embodiment of the present invention.

The coupling portions 103 and 104 are formed by sewing the base fabric sheets 51 and 52 constructing the main airbag 50 and the base fabric sheets 61 and 62 constructing the auxiliary airbag 60 by using the sewing thread. One end of the upper coupling portion 103 is positioned in upper ends of proximal end edges 50B and 60B of the main and auxiliary airbags 50 and 60 or portions near the upper ends, and the other end of the upper coupling portion 103 is positioned in upper end edges 50U and 60U of the main and auxiliary airbags 50 and 60 or portions near the upper end edges 50U and 60U. Further, one end of the lower coupling portion 104 is positioned in lower ends of the proximal end edges 50B and 60B of the main and auxiliary airbags 50 and 60 or portions near the lower ends, and the other end of the lower coupling portion 104 is positioned in lower end edges 50L and 60L of the main and auxiliary airbags 50 and 60 or portions near the lower end edges 50L and 60L. Each of the coupling portions 103 and 104 may be formed in accordance with the adhesion using the adhesive agent, in addition to the seam using the sewing thread. FIG. 30 schematically shows the upper coupling portion 103.

The main airbag 50 is inflated forward by the gas from the inflator 71. The proximal end 50A of the main airbag 50 and the proximal end 60A of the auxiliary airbag 60 are coupled via the coupling portions 103 and 104 in their upper end and lower end. The coupling portions 103 and 104 regulate the inflation and deployment of the auxiliary air bag 60 so as to move away from the main airbag 50. Accordingly, the auxiliary airbag 60 begins to be deployed and inflated toward the boundary portion (the groove portion 39) between the intermediate portion 18 and the outer side portion 17 (refer to a two-dot chain line in FIG. 33). If the deploying direction is oriented, the auxiliary airbag 60 continues being deployed in the deploying direction thereafter. Accordingly, it is possible to inhibit the auxiliary airbag 60 from being inflated and deployed in other directions than the direction toward the boundary portion mentioned above, for example, forward, rearward or the like.

The coupling portions 103 and 104 are positioned in the boundary portion between the main and auxiliary airbags 50 and 60. The coupling portions 103 and 104 are provided in both proximal ends 50A and 60A in the main and auxiliary airbags 50 and 60 and the portions near the proximal ends 50A and 60A. Further, the coupling portions 103 and 104 are respectively provided in the upper end and the lower end of the main and auxiliary airbags 50 and 60. These positions correspond to ends of the inflated portions of the main and auxiliary airbags 50 and 60. Accordingly, the effect applied to the inflation of the main and auxiliary airbags 50 and 60 by the coupling portions 103 and 104 is small.

Figure 33:
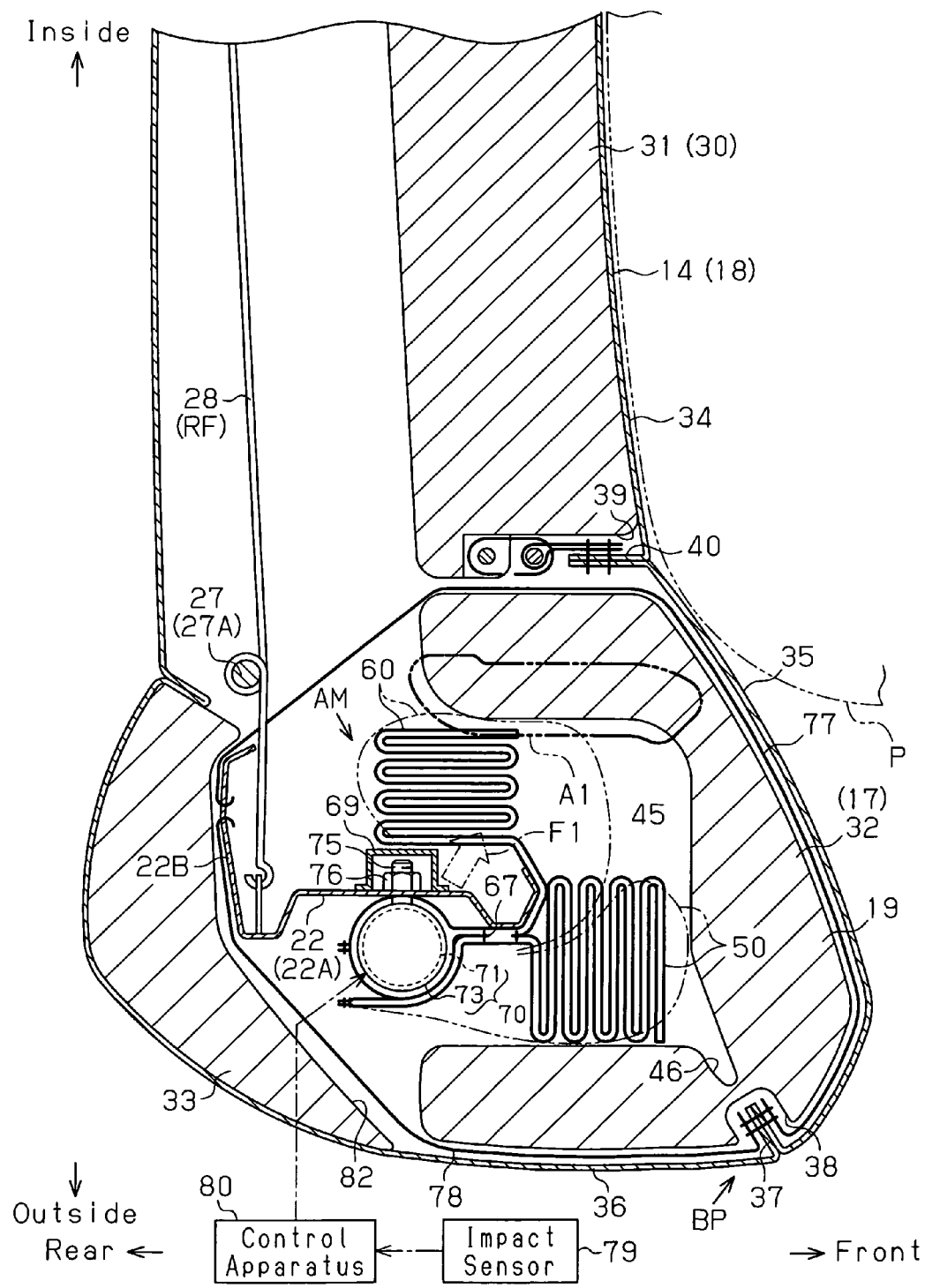
FIG. 33 is a cross-sectional plan view of an outer side portion of a seat back showing the inflating auxiliary airbag and main airbag by a two-dot chain line.
Figure 34:
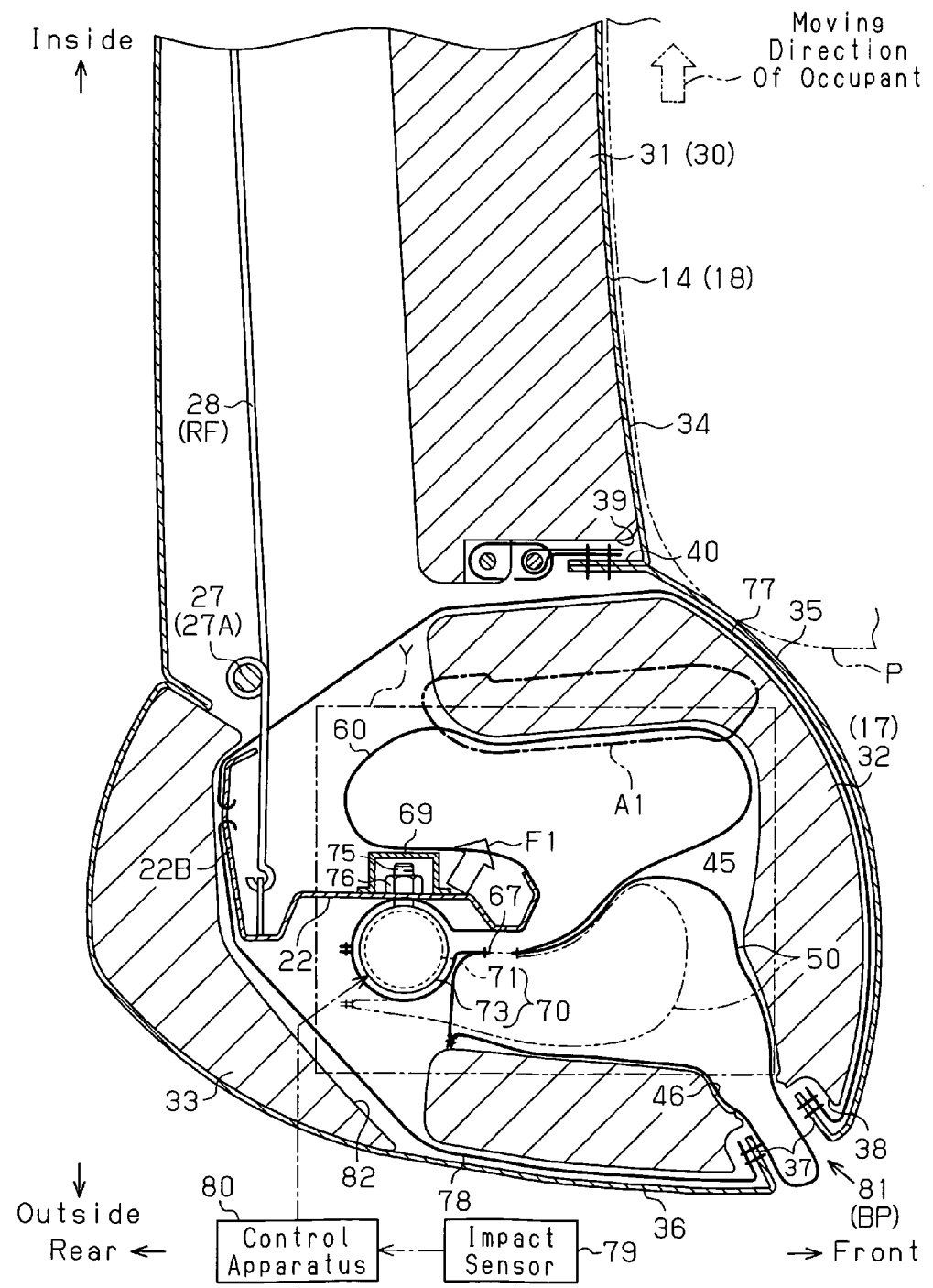
FIG. 34 is a cross-sectional plan view of the outer side portion of the seat back showing a state in which the auxiliary airbag and the main airbag are inflated further from the state in FIG. 33.
Figure 35:
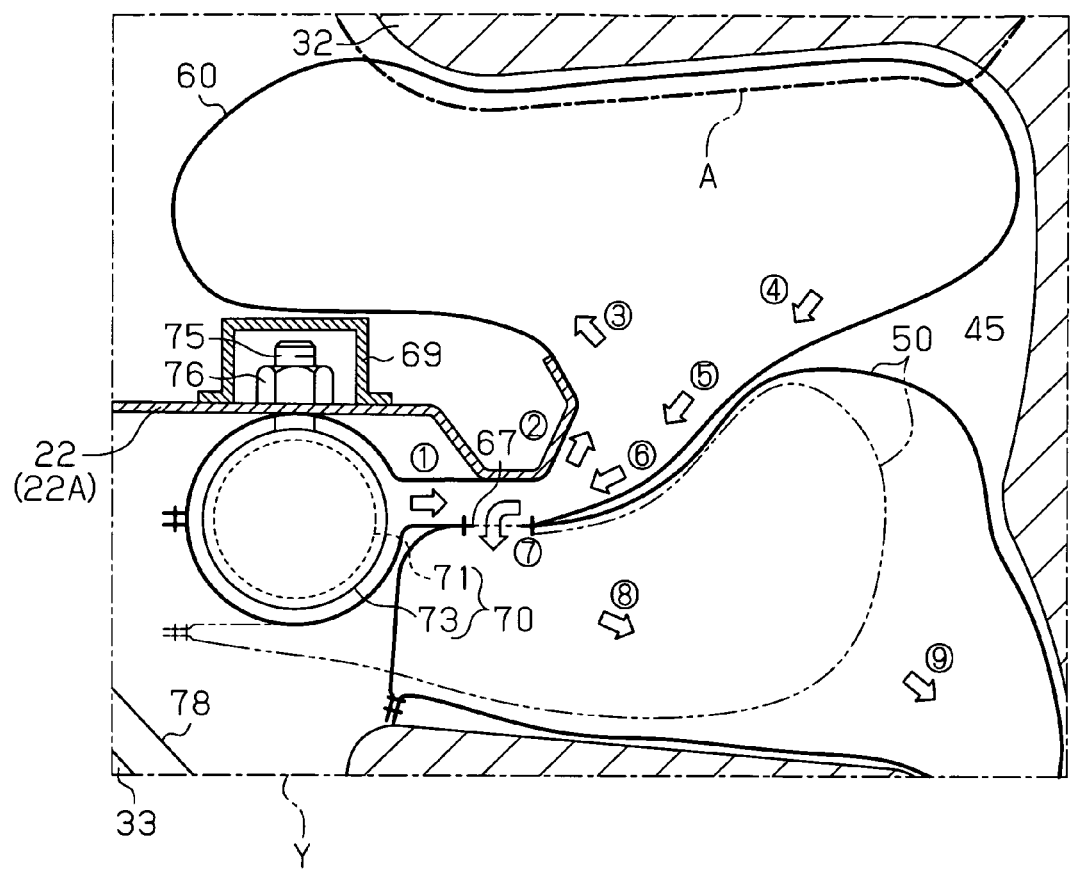
FIG. 35 is a cross-sectional plan view showing a portion Y in FIG. 34 in an enlarged manner.

When the auxiliary airbag 60 is inflated and deployed, the side wall portion 22A of the outer side frame portion 22 having a high rigidity serves as the pressure receiving portion. Accordingly, as shown in FIGS. 33 and 34, the side wall portion 22A of the outer side frame portion 22 receives the pressure of the gas which is diffused within the auxiliary airbag 60, and generates the reaction force F1 directed to the boundary portion (the groove portion 39) between the intermediate portion 18 and the outer side portion 17 of the seat back 14. On the basis of the reaction force F1, the auxiliary airbag 60 is reliably and quickly inflated and deployed diagonally forward, and is brought into contact with the front side pad portion 32. The position A1 close to the intermediate portion 18 of the front side pad portion 32 corresponding to the outer side portion 17 is pressed by the inflating auxiliary airbag 60, and is inflated diagonally to the front. The back of the occupant P reclining against the seat back 14 is pushed diagonally to the front by the inflating front side pad portion 32, and is moved from a position shown by a two-dot chain line to a position shown by a solid line (refer to FIG. 14). The moving direction at this time is a direction of moving away from the body side portion 11 of the vehicle. In other words, prior to the restraint of the occupant P by the main airbag 50, the outer side portion 17 is pressed and inflated by the auxiliary airbag 60, and the occupant P is moved to the vehicle inner side. On the basis of the movement mentioned above, the narrow space S1 between the body side portion 11 and the occupant P is expanded in the vehicle width direction.

If the auxiliary airbag 60 is filled with the gas to some extent, and the internal pressure of the auxiliary airbag 60 is increased, the gas begins to flow into the main airbag 50 through the communicating hole portion 67. Due to this gas, the main airbag 50 begins to be inflated while dissolving the folded state (deploying), after the auxiliary airbag 60 (refer to a two-dot chain line in FIG. 34). Further, the main airbag 50 is brought into contact with the front side pad portion 32. In accordance with the progress of the inflation, the main airbag 50 presses the front side pad portion 32 forward. At this time, a part of the main airbag 50 goes into the slit 46. The main airbag 50 continues being inflated and deployed after going into the slit 46.

Therefore, in accordance with the progress of the inflation of the main airbag 50, the outer side portion 17 is broken at the breakable portion BP, as shown in FIG. 34. In other words, the thin portion between the slit 46 and the groove portion 38 is broken, the sewn state of the side sewn portion 37 is canceled, and the opening 81 is formed. The main airbag 50 shoots out of the seat back 14 from the opening 81 while widening the opening 81 generated by the breakage. At this time, a portion on the vehicle inner side than the opening 81 on the front side pad portion 32 is opened forward around the intermediate sewn portion 40 serving as the supporting point. The portion on the rear side than the opening 81 in the front side pad portion 32 is opened rearward around the notch 82 serving as the supporting point.

As mentioned above, in accordance with the eighth embodiment, the following advantages are obtained.

(1) The side air bag apparatus uses the auxiliary airbag 60 in addition to the main airbag 50. The main airbag 50 shoots out forward from the seat back 14 so as to be inflated and deployed between the body side portion 11 and the occupant P. The auxiliary airbag 60 starts being inflated and deployed prior to the main airbag 50, and presses a portion (A1 shown in FIGS. 33 and 34) near the boundary portion (the groove portion 39) between the intermediate portion 18 and the outer side portion 17 in the seat back 14. Accordingly, it is possible to move the occupant P to the vehicle inner side by the inflating auxiliary airbag 60, and the narrow space S1 between the body side portion 11 and the occupant P is expanded in the vehicle width direction. Further, it is possible to inflate and deploy the main airbag 50 in the outer side of the outer side portion 17 while expanding the space S1 in the vehicle width direction. As a result, since the occupant P is reliably restrained by the main airbag 50, the protection performance for the occupant P against the impact applied form the side portion of the vehicle is improved.

(2) The inflator 71 is arranged within the proximal end 60A of the auxiliary airbag 60. The respective proximal ends 50A and 60A of the main airbag 50 and the auxiliary airbag 60 are superposed. Further, the communicating hole portion 67 for connecting the interior the main airbag 50 with the interior of the auxiliary airbag 60 is provided near the proximal ends 50A and 60A of the main airbag 50 and the auxiliary airbag 60. Further, the inner coupling portion 66 connecting the main and auxiliary airbags 50 and 60 to each other is provided around the communicating hole portion 67 (refer to FIGS. 32A and 32B). Accordingly, it is possible to feed the gas jetted out of the inflator 71 in the order of the auxiliary airbag 60→the communicating hole portion 67→the main airbag 50, so as to start inflating the auxiliary airbag 60 at an earlier timing than the main airbag 50.

(3) Independently from the main airbag 50, the auxiliary airbag 60 is arranged on the vehicle inner side of the outer side frame portion 22 in a state of being folded toward the proximal end 60A from a distal end 60T (refer to FIGS. 30 and 33). Accordingly, it is possible to inflate and deploy the auxiliary airbag 60 toward the boundary portion (the groove portion 39) between the intermediate portion 18 and the outer side portion 17 without being affected by the main airbag 50. Further, the outer side frame portion 22 can reliably inflate and deploy the auxiliary airbag 60 toward the above-described boundary portion, while receiving the gas within the auxiliary airbag 60 so as to generate the diagonally forward reaction force F1 forward. In other words, since the existing outer side frame portion 22 serves as the pressure receiving portion, it is not necessary to independently provide the pressure receiving portion.

Figure 31A:
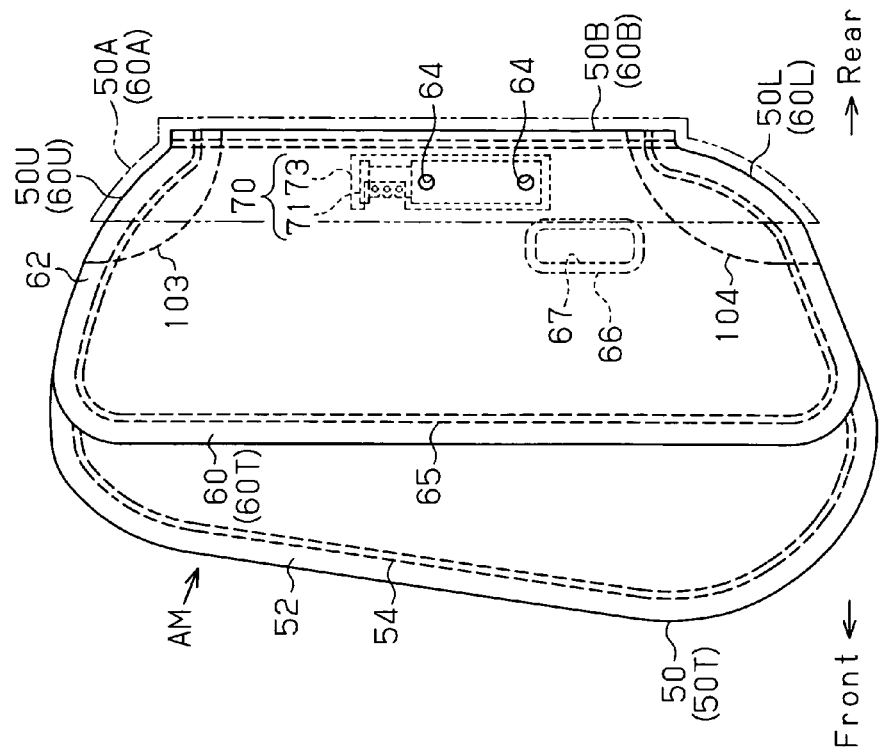
FIG. 31A is a side elevational view as seen from a vehicle outer side, showing an airbag module in a state of being deployed without filling both main and auxiliary airbags with gas.
Figure 31B:
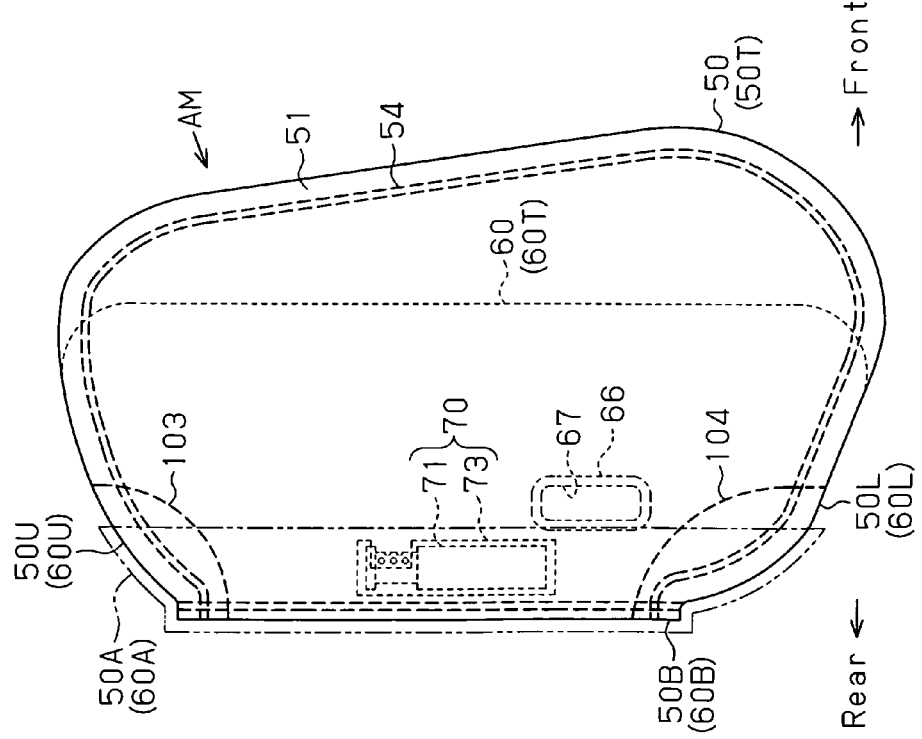
FIG. 31B is a side elevational view as seen from a vehicle inner side, showing an airbag module.

(4) The inflated portion of the auxiliary airbag 60 is coupled to the main airbag 50 by the upper coupling portion 103 and the lower coupling portion 104 (refer to FIGS. 31A and 31B). Accordingly, the deployment at least in the early stage of the inflation of the auxiliary airbag 60 is regulated so as to be directed toward the boundary portion between the intermediate portion 18 and the outer side portion 17 of the seat back 14. Therefore, it is possible to reliably inflate and deploy the auxiliary airbag 60 toward the boundary portion mentioned above from the early stage of the inflation and deployment.

(5) The coupling portions 103 and 104 are respectively provided over both of the proximal ends 50A and 60A of the main and auxiliary airbags 50 and 60 and the portions near the proximal ends 50A and 60A. In this case, the coupling portions 103 and 104 are positioned at the ends of the inflated portions of the main and auxiliary airbags 50 and 60 (refer to FIGS. 31A and 31B). Accordingly, it is possible to reduce the effect on the inflation of the main and auxiliary airbags 50 and 60 by the coupling portions 103 and 104.

(6) The coupling portions 103 and 104 are respectively provided in correspondence to the upper end and the lower end of the inflator 71. In this case, the coupling portions 103 and 104 are positioned at the ends of the inflated portions of the main and auxiliary airbags 50 and 60 (refer to FIGS. 31A and 31B). Accordingly, it is possible to obtain the same advantage as the advantage (5) mentioned above.

(7) It is possible to form the coupling portions 103 and 104 only by sewing the main airbag 50 and the auxiliary airbag 60.

(8) The coupling portions 103 and 104 are provided in the main airbag 50 and the auxiliary airbag 60. Accordingly, it is not necessary to independently provide a member or a mechanism for providing the same function as the coupling portions 103 and 104.

The present invention may be modified as follows without being limited to the embodiments mentioned above.

(b) In place of the coupling portions 103 and 104, it is possible to employ a portion coupling the inflating portion of the auxiliary airbag 60 to the main airbag 50 at one position or three or more positions.

(c) The coupling portions 103 and 104 may be provided in other positions than both ends of the inflator 71.

(d) The position in which the coupling portions 103 and 104 are provided in the main airbag 50 may be set to the inflating portion or the non-inflating portion.

(e) The communicating hole portion 67 may be provided only in the proximal ends 50A and 60A of the main airbag 50 and the auxiliary airbag 60, or may be provided over both of the proximal ends 50A and 60A and the portions near the proximal ends 50A and 60A.

Further, the inflator assembly 70 may be arranged in such a posture that the axis of the inflator 71 is inclined with respect to the vertical line.

The invention claimed is:

1. A side airbag apparatus applied to a vehicle, the vehicle being structured such that a seat back of a vehicular seat is provided with a seat frame and a seat pad arranged near the seat frame, wherein a rear frame portion of the seat frame is arranged near a rear end in an intermediate portion in a vehicle width direction of the seat back, and an intermediate pad portion of the seat pad is arranged near a front end in the intermediate portion, the side airbag apparatus comprising:

an inflator; and an airbag inflated by a gas jetted out of the inflator, wherein the inflator and the airbag are incorporated at least on an outer side portion of the seat back, wherein the airbag has a main airbag and an auxiliary airbag, wherein the main airbag is inflated between a body side portion of the vehicle and an occupant seated on the vehicular seat by being caused to shoot out forward from an outer side portion of the seat back by a gas from the inflator, and wherein the auxiliary airbag pressing a portion near the outer side portion of the intermediate pad portion forward by being inflated between the rear frame portion and the intermediate pad portion by the gas from the inflator.

2. The side airbag apparatus according to claim 1, wherein the auxiliary airbag is supplied with the gas from the inflator prior to the main airbag.

3. The side airbag apparatus according to claim 2, wherein the main airbag and the auxiliary airbag are coupled to each other via a communicating hole portion connecting the interior of the main airbag and the interior of the auxiliary airbag to each other, and wherein the inflator is arranged within the auxiliary airbag.

4. The side airbag apparatus according to claim 3, wherein the inflator is formed as an elongated shape, wherein a gas outlet port is provided in one end portion of the inflator, and wherein the communicating hole portion is located close to an end portion on an opposite side to the gas outlet port of the inflator.

5. The side airbag apparatus according to claim 3, wherein an outer side frame portion constructing the seat frame is arranged within an outer side portion of the seat back, wherein an inner side frame portion constructing the seat frame is arranged within an inner side portion of the seat back, and wherein the auxiliary airbag is arranged on the vehicle inner side of the outer side frame portion in a state of being folded independently from the main airbag.

6. The side airbag apparatus according to claim 5, further comprising guide means for guiding the auxiliary airbag between the rear frame portion and the intermediate pad portion at least in an early stage of the inflation of the auxiliary airbag.

7. The side airbag apparatus according to claim 6, wherein the guide means is provided with a rear guide member arranged on the front side of the rear frame portion, and the rear guide member has a rear guide surface which is substantially orthogonal to a forward moving direction of the vehicle.

8. The side airbag apparatus according to claim 6, wherein the guide means is constituted by a band-like member extending along a vehicle width direction, and wherein a part of the band-like member is put through a gap provided at a position other than the communicating hole portion between the main airbag and the auxiliary airbag.

9. The side airbag apparatus according to claim 8, wherein a band body that is made of a material having a low extendability and provided for assisting a breakage of the outer side portion by the inflating main airbag is arranged around an outer side portion of the seat pad, and wherein the band body is used as the band-like member, and a part of the band body is put through the gap.

10. The side airbag apparatus according to claim 8, wherein one end portion of the band-like member is fixed to the outer side frame portion, and wherein the other end portion of the band-like member is fixed to the inner side frame portion.

11. The side airbag apparatus according to claim 1, wherein the auxiliary airbag is arranged in a state of being deployed between the rear frame portion and the intermediate pad portion, wherein a band-like member for retaining the auxiliary airbag in a deployed state is provided within the seat back, wherein one end portion of the band-like member is coupled to an inner end of the auxiliary airbag, and wherein the other end portion of the band-like member is coupled to the vehicle inner side than the inner end of the auxiliary airbag in the seat frame.

12. The side airbag apparatus according to claim 2, wherein the main airbag and the auxiliary airbag are arranged in an independent state from each other, wherein the inflator comprises:

a main inflator arranged within the main airbag; and an auxiliary inflator arranged within the auxiliary airbag, and wherein the auxiliary inflator starts supplying the gas to the auxiliary airbag prior to the main inflator.

13. The side airbag apparatus according to claim 1, wherein a pressure receiving plate receiving a pressure of the gas within the auxiliary airbag so as to generate a forward reaction force is arranged on the rear side of the rear frame portion.

\* \* \* \* \*